US008775214B2

(12) United States Patent
Birbara et al.

(10) Patent No.: US 8,775,214 B2
(45) Date of Patent: Jul. 8, 2014

(54) MANAGEMENT METHOD AND SYSTEM FOR A USER

(75) Inventors: Linda H. Birbara, New York, NY (US); John P. Bench, Norfolk, MA (US); Patrick C. Kim, New York, NY (US); Alexander M. Kleiner, Woodbridge, CT (US); Matthew P. Burkley, Cambridge, MA (US); Nicholas Prastos, Closter, NJ (US); Douglas Schneider, Cincinnati, OH (US); Barbara Coluni, Ann Arbor, MI (US)

(73) Assignee: Thompson Reuters (Market) LLC, New York, NY (US)

( * ) Notice: Subject to any disclaimer, the term of this patent is extended or adjusted under 35 U.S.C. 154(b) by 1206 days.

(21) Appl. No.: 11/489,213

(22) Filed: Jul. 19, 2006

(65) Prior Publication Data
US 2008/0033871 A1 Feb. 7, 2008

(51) Int. Cl.
*G06Q 40/00* (2012.01)
*G06Q 40/08* (2012.01)
*G06Q 50/22* (2012.01)

(52) U.S. Cl.
CPC .............. *G06Q 40/08* (2013.01); *G06Q 50/22* (2013.01)
USPC .................................................. 705/4; 705/3

(58) Field of Classification Search
CPC ............................ G06Q 40/08; G06Q 50/22
USPC ............................................... 705/2–4
See application file for complete search history.

(56) References Cited

U.S. PATENT DOCUMENTS

| 5,644,727 | A | * | 7/1997 | Atkins | 705/40 |
| 5,832,488 | A | * | 11/1998 | Eberhardt | 707/10 |
| 6,088,451 | A | * | 7/2000 | He et al. | 726/8 |
| 6,253,192 | B1 | * | 6/2001 | Corlett et al. | 705/36 R |
| 6,862,614 | B2 | * | 3/2005 | Paradinas et al. | 709/220 |
| 7,039,593 | B2 | * | 5/2006 | Sager | 705/4 |

(Continued)

FOREIGN PATENT DOCUMENTS

| WO | WO 00/25227 | 5/2000 |
| WO | WO 00/34873 | 6/2000 |

(Continued)

OTHER PUBLICATIONS eMoney Advisor, Advisor Platform, www.emoneyadvisor.com, pp. 1-12.*

(Continued)

*Primary Examiner* — Sheetal R Rangrej

(57) ABSTRACT

The invention provides a system, method, machine readable program and a graphical user interface for managing multiple accounts associated with a user. The method includes receiving a first set of information associated with identification of a user, in response to the first set of information, identifying a second set of information relating to a financial account associated with the user, the financial account being associated with a financial institution, in response to the first set of information. The method also includes identifying a third set of information relating to a health account associated with the user, the health account being associated with a healthcare institution. A fourth set of information is generated based upon the second set of information and the third set of information. The method also includes sending a signal representative of the fourth set of information. The signal may be sent to the user or a designee of the user.

53 Claims, 21 Drawing Sheets

(56) References Cited

U.S. PATENT DOCUMENTS

| | | | |
|---|---|---|---|
| 2003/0009355 A1* | 1/2003 | Gupta | 705/2 |
| 2003/0046113 A1 | 3/2003 | Johnson et al. | |
| 2004/0078423 A1 | 4/2004 | Satyavolu et al. | |
| 2005/0192830 A1* | 9/2005 | Pugh et al. | 705/1 |

FOREIGN PATENT DOCUMENTS

| | | |
|---|---|---|
| WO | WO 00/73921 | 12/2000 |
| WO | WO 01/08000 | 2/2001 |
| WO | WO 01/18663 | 3/2001 |
| WO | WO 01/27884 | 4/2001 |
| WO | WO 01/29757 | 4/2001 |
| WO | WO 01/31463 | 5/2001 |
| WO | WO 02/10959 | 2/2002 |
| WO | WO 02/056142 | 7/2002 |
| WO | WO 02/082295 | 10/2002 |
| WO | WO 03/061187 | 7/2003 |
| WO | WO 2005/065366 | 7/2005 |

OTHER PUBLICATIONS

Lauterbach, Jeffery R., et al. The Attitudes and Behavioral Styles of Successful Advisors. The Wendling Group and The Capital Trust Company of Delaware. Sep. 11, 2001.*

Main Street Financial, "Wealth Management Solution" (CD and Brochure), 036712-000.

eMONEY Advisor, "Maximizing the Advisor-Client Relationship", www.emoneyadvisor.com, (888) 362-4612.

eMONEY Advisor, Advisor Platform Security Information, eMA-20060608, 4 pgs.

Yodlee—Solutions Overview. Yodlee Moneycenter. MoneyCenter—Turn your.

eMONEY Advisor, "Maximizing the Advisor-Client Relationship", www.emoneyadvisor.com, (888) 362-4612, Nov. 2, 2005.

eMONEY Advisor, Advisor Platform Security Information, eMA-20060608, 4 pgs, Nov. 2, 2005.

Cash Edge, All Data, Data Consolidation, Jul. 2005.

Yodlee—Yodlee Press Releases—About Yodlee, Press Room, "Yodlee Launches Suite of Next-Generation Online Banking Applications: Yodlee MoneyCenter," http://corporate.yodlee.com/company/press_room/previous/2006/06/yomoneycenter.html, Aug. 22, 2006, 3 pages.

Yodlee—Yodlee Solutions to Help Financial Services Providers—Personal Finance, Wealth Management, Risk Management, Market Research . . . Solutions Overview—"Make your website essential to customers", http://corporate.yodlee.com/solutions/solutions_overview/solutions_overview.htm Aug. 22, 2006, 3 pages.

Yodlee—Solutions Overview. Yodlee Moneycenter. MoneyCenter—Turn your website into customers' primary source for day-to-day financial management—Solutions Overview, http://corporate.yodlee.com/solutions/personal_finance/yodlee_moneycenter.htm, 5 pages, Aug. 22, 2006.

Yodlee—Solutions Overview. Yodlee Billpay. BillPay—Lower total cost of ownership and generate revenue, http://corporate.yodlee.com/solutions/personal_finance/yodlee_billpay.htm Aug. 22, 2006, 4 pages.

Yodlee—Solutions Overview. Personal Finance, Personal Finance—Grow Revenue through deeper customer relationships, http://corporate.yodlee.com/solutions/personal_finance/personal_finance.htm Aug. 22, 2006, 5 pages.

Yodlee—Solutions Overview. Funds Transfer, Funds Transfer—Move Funds Quickly to where they are needed most, whether at the primary FSP or elsewhere, http://corporate.yodlee.com/solutions/personal_finance/funds_transfer.htm, Aug. 22, 2006, 4 pages.

The Written Opinion of the International Seaching Authority (ISA), Sep. 11, 2008.

International Search Report, Sep. 11, 2008.

* cited by examiner

Make Thomson Health & Wealth your home page

THOMSON    HEALTH AND WEALTH

Welcome, Stuart Ludwigsen

Search the site [  ] Search

Health & Wealth Home – Help

| My Dashboard | Health Profile | Wealth Profile | My Goals | Health Plan | Financial Details | Medication Details | Health History | Tools | Care Providers | Lock Box |

Tools and Calculators ▼ | Advisors | Transact | Recommendations

Profile for: Stuart sees his Health Profile Overview, which gives him a high-level snapshot of his current health situation.

He clicks on 'Medication Details' to see what his current prescriptions are and how much he's paying for each.

Stuart Ludwigsen's Health Profile    [Edit]    — 232

Age:         Stuart Ludwigsen   Address:   321 Main Street
SSN:         555-55-5555                   Chicago, Illinois 60618
Birth Date:  June 1, 1956       Primary Phone: 312-333-4567
Age:                                       _____@gmail.com
Gender:
Weight:
Smoker:

Health Plan Information

Current Plan:        Health Plus          Dependents:   Christina Ludwigsen
Member ID:           90848489392B-01                    James Ludwigsen
Primary Physician:   Add Physician
Months Enrolled:     33

Year-to-Date Cost and Use Summary

Total Payments:  $4,684.00    Hospital Visits:         1
Plan Paid:       $3,839.00    Office Visits:           5
Deductibles:     $0.00        Emergency Room Visits:   1
Co-payments:     $845.00      Laboratory Tests:        3
                              Prescriptions Filled:   17

Drug Summary    [Edit]    — 234

| Prescription Name | Dosage | Last Refill | Refill On |
|---|---|---|---|
| Feldene  | 20mg | 5/15/2006 | 7/15/2006 |
| Lipitor  | 20mg | 4/01/2006 | 7/21/2006 |
| Accupril | 30mg | 5/21/2006 | 6/21/2006 |
| Nexium   | 60mg | 5/15/2006 | 8/15/2006 |
| Proventil| 90mg | 5/29/2006 | 6/29/2006 |

Health & Wellness Index    [Edit]    — 236

Health Risk Score: 82/100

| Health Item | Last Service Date | Status |
|---|---|---|
| Preventive Care | | |
| Prostate Antigen Test: | 12/01/2006 | Overdue △ |
| Stop Smoking Seminar: | 4/13/2006 | Up-to-date ○ |
| Cholesterol Screening: | N/A | Missing ● |
| Colon Cancer Screening: | N/A | Missing ● |
| Primary Care Visit: | 5/21/2006 | Up-to-date ○ |
| Dental Visit: | 3/15/2006 | Up-to-date ○ |
| Disease Management | | |
| Heart Disease Lipid Test: | 6/01/2006 | Up-to-date ○ |
| Heart Disease Rx-Beta Blocker: | 5/21/2006 | Up-to-date ○ |
| Asthma Spirometry: | 5/21/2006 | Up-to-date ○ |
| Asthma Rx-Inhaled Steroid: | 9/15/2005 | Overdue △ |

Disease Profile    — 238

| Condition | Diagnosed On | Treating Physician |
|---|---|---|
| Coronary Artery Disease | 5/15/2002 | Dr. Susan Gittrist |
| Asthma | 4/01/1996 | Dr. Sarah Williams |
| COPD | 5/21/1997 | Dr. Michael Gilaland |

Health History Summary    — 240

| Date | Provider | Diagnosis | Procedure | Payment |
|---|---|---|---|---|
| 3/10/2005  | Dr. Sarah Williams | Acute Bronchitis | Outpatient Visit | $23 |
| 3/10/2005  | Dr. Sarah Williams | Acute Bronchitis | Ceftriaxone Injection | $60 |
| 11/23/2004 | Dr. Sarah Williams | Pneumonia | Outpatient Visit | $60 |

Personal Profile

Personal Profile

Make Thomson Health & Wealth your home page

THOMSON    HEALTH AND WEALTH

Welcome, Stuart Ludwigsen
[Sign Out, My Account]

Search the site [_____] Search

Health & Wealth Home – Help

| My Dashboard | Health Profile | Wealth Profile | My Goals | Tools and Calculators | Advisors | Transact | Recommendations |

Profile for: [Stuart Ludwigsen ▾]

Overview | Health Plan | Financial Details | Medication Details | Health History | Tools | Care Providers | Lock Box

[My Medications] [Medication Alerts] — 246

| ☑ | Prescription Name ▸ | Dosage ▸ | Quantity ▸ | Last Refill ▸ | Refill On ▸ | Refill Cost ▸ | Annual Cost ▸ |
|---|---|---|---|---|---|---|---|
| ☐ | Feldene | 20 mg | 1/Day | 5/15/06 | 7/15/06 | $15.50 | $179.94 |
| ☐ | Lipitor | 20 mg | 1/Day | 4/1/06 | 7/21/06 | $85.95 | $572.00 |
| ☐ | Accupril | 60 mg | 1/Day | 5/21/06 | 6/21/06 | $66.99 | $384.00 |
| ☑ | Nexium | 30 mg | 1/Day | 5/15/06 | 8/15/06 | $115.60 | $430.00 |
| ☐ | Proventil | 90 mg | 3/Day | 5/29/06 | 6/29/06 | $46.50 | $180.00 |

— 245

Total Annual Cost: $3,553.46

[Delete Selected] [Save]

He has recently stopped taking Nexium, so he deletes it from his list, and sees the annual total update accordingly.

looking over his current medications, he sees he is spending $3,553.46 on prescription medications each year.

Personal Profile

Make Thomson Health & Wealth your home page

THOMSON    HEALTH AND WEALTH

Welcome, Stuart Ludwigsen
[Sign Out, My Account]

Search
the site [_____] Search

Health & Wealth Home – Help

| My Dashboard | Health Profile | Wealth Profile | My Goals | Tools and Calculators ▶ |

Profile for: Stuart Ludwigsen ▼ | Overview | Health Plan | Financial Details | Medication Details | Health History | Tools | Care Providers | Lock Box Stuart clicks on the 'Tools' link and selects 'Health Cost Calculator' to see a simulation of what his future health care costs may be.

— 248

Tools:
- Health Cost Calculator
- Drug Cost Calculator
- Finance Monitor
- Treatment Cost Calculator
- Drug to Drug Interaction Checker
- Health Plan Modeler
- Treatment Evaluation Tools My Medications | Medication Alerts

— 246        — 244       — 247

| ☑ | Prescription Name ▾ | Dosage ▾ | Quantity ▾ | Last Refill ▾ | Refill On ▾ | Refill Cost ▾ | Annual Cost |
|---|---|---|---|---|---|---|---|
| ☑ | Feldene | 20 mg | 1/Day | 5/15/06 | 7/15/06 | $15.50 | $1 |
| ☐ | Lipitor | 20 mg | 1/Day | 4/1/06 | 7/21/06 | $85.95 | $5 |
| ☐ | Accupril | 60 mg | 1/Day | 5/21/06 | 6/21/06 | $66.99 | $384.00 |
| ☐ | Proventil | 90 mg | 3/Day | 5/29/06 | 6/29/06 | $46.50 | $180.00 |

— 245

He has recently stopped taking Nexium, so he deletes it from his list, and sees the annual total update accordingly.

Total Annual Cost: $3,123.46

[Delete Selected] [Save]

His annual drug costs went down, but he's still curious to see how his personal health care situation may affect his overall medical costs in the future.

MANAGEMENT METHOD AND SYSTEM FOR A USER

COPYRIGHT NOTICE

A portion of the disclosure of this patent document contains material which is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND OF THE INVENTION

1. Field of the Invention

The present invention relates to a method, system, and machine readable program that may include a graphical user interface for assisting a user, such as a consumer. Particularly, the present invention is directed to an integrated system that can facilitate management of the financial, health, and other affairs of a consumer, as desired.

2. Description of Related Art

A variety of computer implemented systems including graphical user interfaces are known in the art for helping users, such as consumers, manage various aspects of their lives. For example, service providers, such as financial institutions that provide banking services, frequently provide online access to a user so that the user can view the balances of their accounts with the institution. Online access to personal information specific to institutions offering various services has been growing, and has started to become very common. For example, it is becoming more common for a user to access personal health related information online, such as from a website built by their health insurance provider. Indeed, many services have become available online.

While the availability of services online has initially presented many advantages to the user, it is not without its problems. For example, so many aspects of management of a user's affairs have gone online that it has become cumbersome and difficult for a user to keep track of user names and passwords for accounts for multiple bank accounts and brokerages, auto and health insurance accounts, tax accounts, online learning accounts, mortgages, credit cards, and the like. As can be seen, while online access has solved certain problems and created convenience, it has also created confusion and a highly segmented view of a consumer's state of affairs.

Moreover, with the internet boom, nearly every kind of information one can think of has become available online as well. For example, financial advice, health advice and legal advice, among myriad others, can all be found by a user online. As so much information is available, it is difficult for a user to find the correct information that they need, let alone determine which information is the most accurate and therefore useful to the user.

At the same time, new dynamics are reshaping the Wealth Management industry. Because of online access, potential customers for services have become more empowered than ever before. For example, over the past twenty years, retirement responsibilities have shifted largely from institutions to individuals. Indeed, nearly seventy percent of U.S. households now have two or more financial relationships that they manage. These financial relationships are managed through checking, savings, money market, retirement, 401k, stock and other accounts. Although the internet and online access have created some confusion as described above, the Internet has also provided unprecedented transparency to wealth management performance and shifted decision maker power to the end client.

Compounding the above, the "baby boomer" population is aging and starting to think about retirement. Nearly 76 million baby boomers account for one-third of the total US population. Two-thirds of baby boomers, or about 46 million people, will likely retire before 2013. As investors become more sophisticated, they require access to multi-asset class solutions, including fixed income and alternative investments. Baby boomers will drive more assets into the investable asset market, possibly thirty trillion dollars by 2010. The baby boomer generation will then move from "saving" to "income preservation," requiring increased tax planning.

Self management for retirement and healthcare is becoming increasingly complex. As the population continues to age, there will be a shift to self-managed retirement plans. Most customers are now in defined contribution plans, as evidenced by the expanding 401K market which reached $1.6 trillion in assets in 2003. There has also been a shift to self-managed healthcare planning: Healthcare costs account for nearly 26% of all retirement funds. This percentage of funds will likely grow with increasing health care costs as time progresses.

As shown above, while there has been a shift to systems that can permit more convenient management of an individual's personal affairs online, the nature of what an individual needs to manage is growing increasingly complex. Moreover, while the availability of information that would be useful to such individuals has been growing, finding and distilling the information useful for an individual presents a problem. As such, there exists a strong and growing need for a system that can help an individual collect and manage myriad information relating to their affairs. The present invention provides a solution for these and other needs, as described herein.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a method for managing multiple accounts associated with a user. The method includes receiving a first set of information associated with identification of a user. The method also includes identifying, in response to the first set of information, a second set of information relating to a financial account associated with the user. The financial account is associated with a financial institution. The method also includes identifying, in response to the first set of information, a third set of information relating to a health account associated with the user. The health account is associated with a healthcare institution. The method further includes generating a fourth set of information based upon the second set of information and the third set of information. Additionally, the method includes sending a signal representative of the fourth set of information. The signal may be sent to the user or a designee of the user, for example.

In accordance with a further aspect of the invention, the first set of information may include information selected from the group including an account number such as a user's social security number, taxpayer identification number, bank account number, website username, email address, telephone number, a date and combinations thereof. The financial account may be selected from the group including a bank account, a tax account, a mortgage account, education account, credit account, brokerage account and a retirement account, for example. The health account may be selected from the group including a benefits record, a health insurance account, a disability insurance account, a long term care insurance account, a medical record account and a pharmaceutical record account, among others. Transactions performed using data relating to the health of the user may be transacted in accordance with a preselected standard. For example, the preselected standard may be one established in accordance with the Health Insurance Portability and Accountability Act ("HIPAA").

In accordance with a further aspect of the invention, the fourth set of information may be an amalgamation of the second set of information and the third set of information. If desired, the fourth set of information may be a subset of an amalgamation of the second set of information and the third set of information. If desired, a fifth set of information may be identified in response to the first set of information. The fifth set of information may relate to the financial account, or a second financial account of the user. The second financial account may be associated with the financial institution or a second financial institution. If desired, the fourth set of information may be generated using the fifth set of information and at least one of the second and third sets of information. If desired, multiple financial accounts may be accessed by the user from a single or multiple financial institutions.

In accordance with a further aspect of the invention, a sixth set of information may be identified in response to the first set of information, the sixth set of information relating to a second health account of the user, the second health account being associated with a second health institution. If desired, the fourth set of information may be generated using the sixth set of information and at least one of the second, third sets of information. If desired, multiple health accounts may be accessed by the user from a single or multiple health institutions.

In accordance with still a further aspect of the invention, the second set of information may further include information relating to a financial advisor of the user. If desired, the financial advisor may be selected from the group including a stockbroker, a financial planner, an accountant, a credit analyst, a real estate agent, and an attorney, among others. The second set of information may include information relating to the credentials of the financial advisor, among other things.

In accordance with yet a further aspect of the invention, the third set of information may further include information relating to a health advisor of the user. The health advisor may be selected from the group including a doctor, a health insurance agent, a physical therapist, a psychologist, a nutritionist, a therapist and a spiritual advisor, among others. The second set of information may include data relating to the credentials of the health advisor.

In accordance with a further aspect of the invention, the signal may be related to a set of actionable information. An operation can be performed on the set of actionable information. The operation may be performed by using a decision support tool selected by the user. Preferably, the decision support tool permits computation of a financial projection, a health projection or a lifestyle projection. By way of example, the decision support tool may be selected from the group consisting of a retirement calculator, a college savings calculator, a drug cost saving calculator, and combinations thereof. Preferably, the actionable information relates to at least one of a financial or a healthcare decision.

In accordance with a further aspect of the invention, the method further includes receiving a decision associated with the user in response to the set of actionable information. The second and/or third sets of information may be updated based upon the decision. The decision may include an affirmative response, a negative response or another response, as appropriate. For example, a user can be asked to postpone any decision.

In accordance with a further aspect of the invention, the signal representative of the fourth set of information may be forwarded as an alert to the user. The alert may relate to a health decision or a financial decision. The alert may be sent to the user by way of electronic mail. If desired, alert may include a financial projection that computes the effect of costs of the health or lifestyle of the user on the user's finances. An alert differs from a set of actionable information in that the alert does not require an action on the part of the user. A user taking action can include, for example, a user electing taking action at the time the actionable information is first reviewed by the user, by a user declining to take action, and by a user deciding to be reminded to take action at a time in the future, among other actions.

In accordance with a further aspect of the invention, the user may permit an advisor to access desired profile information relating to the user in a database. The advisor may be a financial advisor and the profile information may include financial information relating to the user. If desired, the user may specify a subset of the profile information that the advisor can access. The advisor may be a health advisor and the profile information may include health information relating to the user.

In further accordance with the invention, a system for managing multiple accounts associated with a user is provided. The system includes means for receiving a first set of information associated with identification of the user. The system also includes means for identifying a second set of information in response to the first set of information, the second set of information relating to a financial account associated with the user, the financial account being associated with a financial institution. The system also includes means for identifying a third set of information in response to the first set of information, the third set of information relating to a health account associated with the user, the health account being associated with a healthcare institution. The system also includes means for generating a fourth set of information based upon the second set of information and the third set of information, and means for sending a signal representative of the fourth set of information to the user or a designee of the user.

In further accordance with the invention, a machine readable program on a computer readable medium containing instructions for controlling a system for managing multiple accounts associated with a user is provided. The program includes a first computer code segment for processing a first set of received information associated with identification of the user and a second computer code segment for identifying a second set of information in response to the first set of information, the second set of information relating to a financial account associated with the user, the financial account being associated with a financial institution. The program further includes a third computer code segment for identifying a third set of information in response to the first set of information, the third set of information relating to a health account associated with the user, the health account being associated with a healthcare institution. The program also includes a fourth computer code segment for generating a fourth set of information based upon the second set of information and the third set of information, and a fifth computer code segment for sending a signal representative of the fourth set of information to the user or a designee of the user.

In accordance with still another aspect of the invention, a graphical user interface for controlling a system for managing multiple accounts associated with a user is provided. The graphical user interface includes a first field for receiving a first set of information associated with identification of the user and a second field for specifying a second set of information relating to a financial account associated with the user, the financial account being associated with a financial institution. The interface further includes a third field for specifying a third set of information relating to a health account associated with the user, the health account being associated with a healthcare institution. The interface also includes a fourth field for requesting generation of a fourth set of information based upon the second set of information and the third set of information, and a fifth field for displaying a signal representative of the fourth set of information to the user or a designee of the user.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

Figure 8:
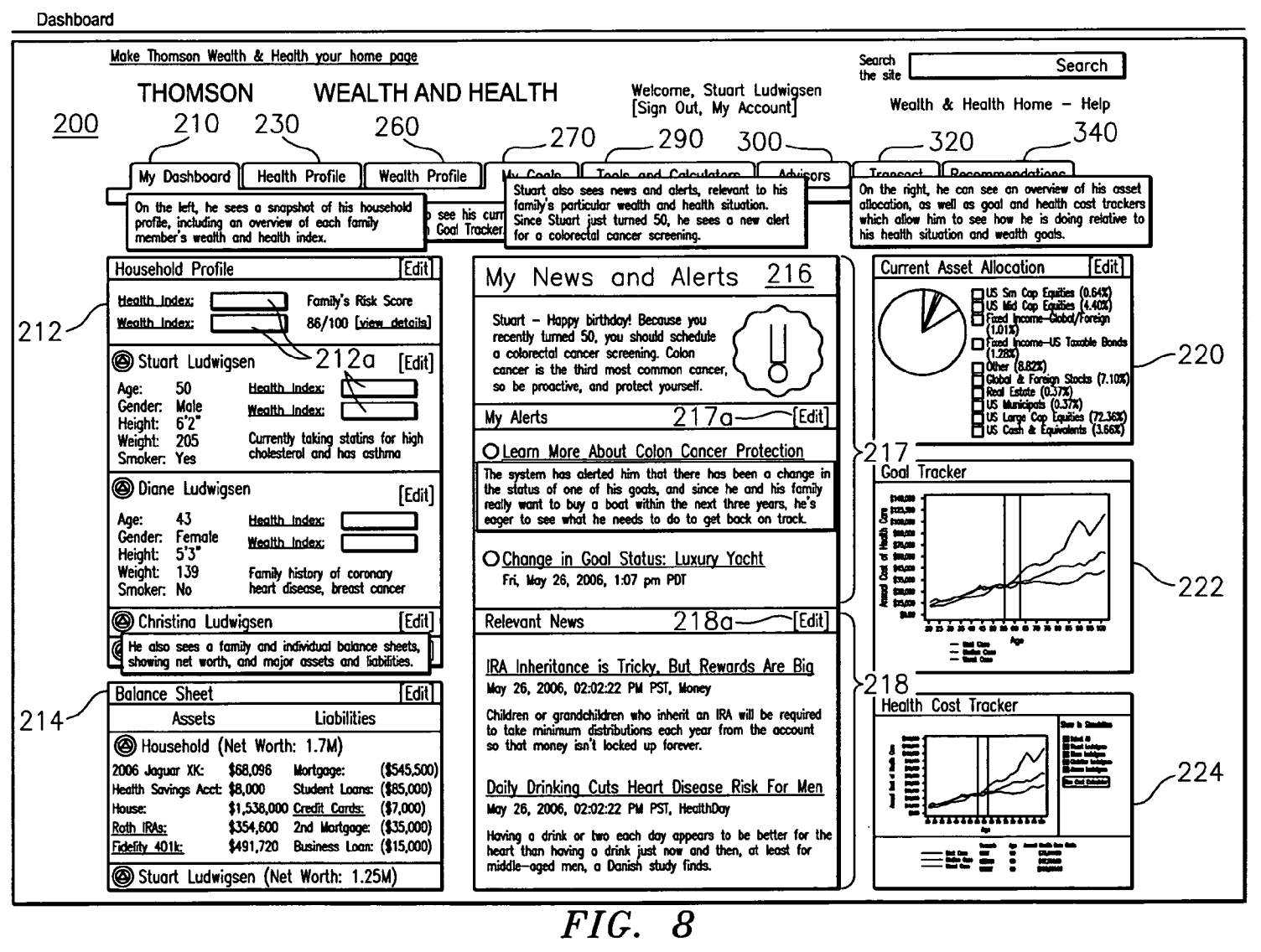

FIG. 8 depicts an exemplary graphical user interface made in accordance with the invention depicting a summary view for a consumer.

FIG. 10 depicts a portion of the graphical user interface of FIG. 8 displaying the consumer's health profile.

FIG. 11 depicts a portion of the graphical user interface of FIG. 8 displaying a summary of the consumer's pharmaceutical prescriptions.

FIG. 12 depicts a further view of the summary depicted in FIG. 11.

FIG. 13 depicts a portion of the graphical user interface of FIG. 8 displaying results of a health cost calculator.

FIG. 14 depicts a portion of the graphical user interface of FIG. 8 displaying certain aspects of a drug cost calculator.

FIG. 15 depicts a portion of the graphical user interface of FIG. 8 displaying a summary of advisors of the consumer.

FIG. 19 depicts and updated view of the summary depicted in FIG. 8.

DETAILED DESCRIPTION OF THE PREFERRED EMBODIMENT

Reference will now be made in detail to the present preferred embodiments of the invention, examples of which are illustrated in the accompanying drawings. The method and corresponding steps of the invention will be described in conjunction with the detailed description of the system, machine readable program and graphical user interface as described herein.

The devices and methods presented herein may be used to assist a user, such as a consumer in making financial and health related decisions. The present invention is particularly well suited for assisting a user, such as a consumer to study the interaction between their health and their finances. It will be appreciated that the user can include a consumer, as well as a designee of the consumer, such as a legal designee (e.g, guardian or parent), as well as an advisor of the consumer as described herein. Thus, the user can be considered to be anyone capable of using the system described herein to help accomplish a useful, tangible end result.

Thus, in accordance with the invention, a system and associated method for managing multiple accounts associated with a user, such as a consumer, is provided. It will be understood that an account "associated with" a "user" can refer to an account that belongs to a consumer (as such, the account is "associated with" the consumer). Similarly, an account of a consumer may be "associated with" an advisor of the consumer by the consumer giving the advisor access to view the account of the consumer by way of system 100.

Figure 1:
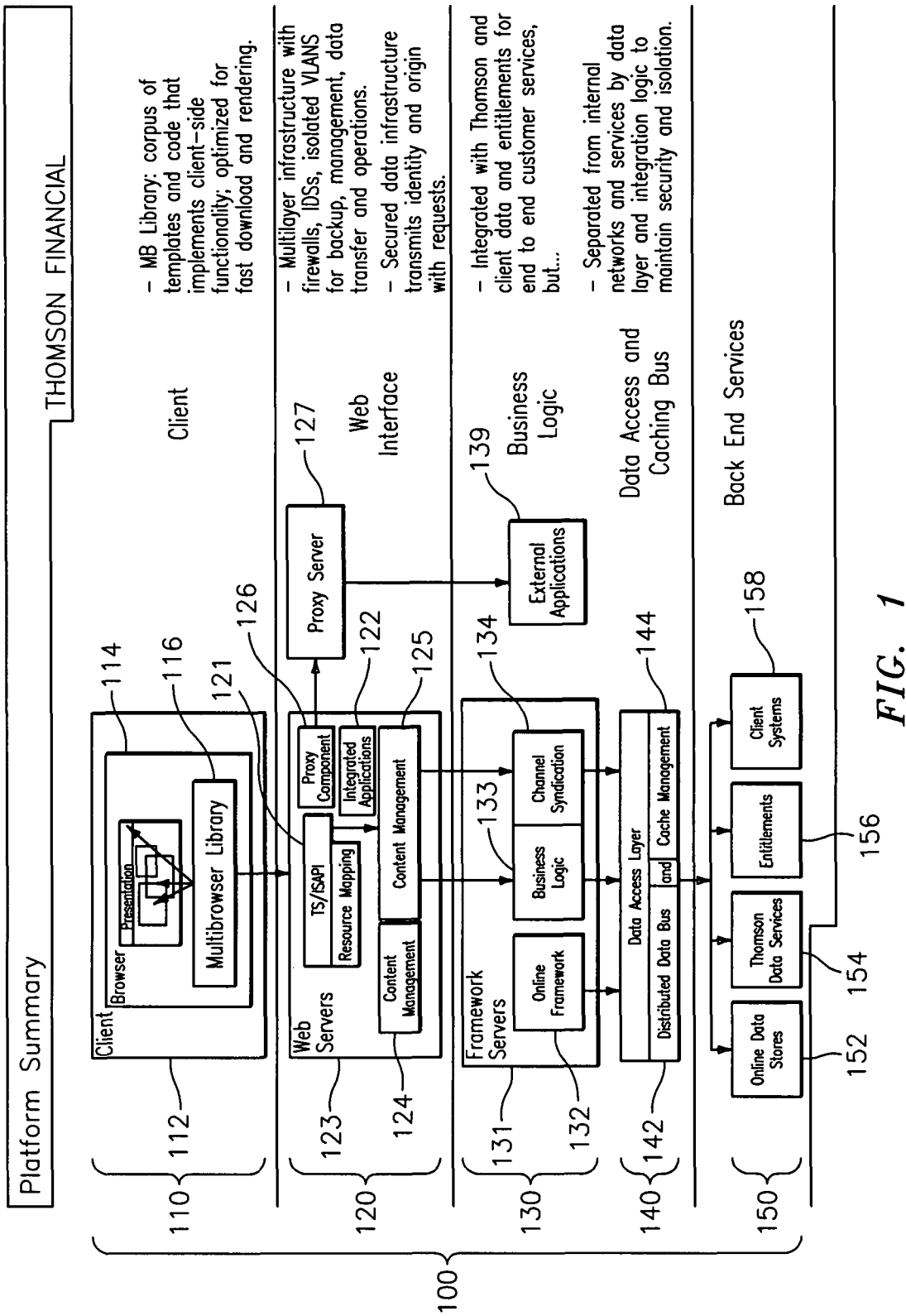
FIG. 1 is a schematic view of a first representative embodiment of a system made in accordance with the present invention.

For purposes of illustration and not limitation, as depicted in FIG. 1, a schematic representation of an overview of a system made in accordance with the invention is designated generally by reference character 100. As depicted in FIG. 1, system 100 includes a client layer 110, a web interface 120, a business logic layer 130, a data access layer 140 and a back end services layer 150. Other embodiments of a system in accordance with the invention, or aspects thereof, are provided in FIGS. 2-19, as will be described.

Thus, in accordance with the invention, the system includes means for receiving a first set of information associated with identification of the user.

For purposes of illustration and not limitation, as embodied herein and as depicted in FIG. 1, system 100 is provided with a client layer 110. Client layer 110 is preferably adapted to receive a first set of information associated with identification with the user. Client layer 110 of system 100 preferably includes libraried data stored on a client terminal 112 at a client location. However, it will be recognized that system 100 can be configured so that a user can access the system without storing files at the location of the user. As depicted in FIG. 1, client layer 110 can be provided with a browser 114 adapted and configured to interact with a multibrowser library 116. Multibrowser library 116 permits a user to have a similar experience across different types of browsers. For example, a variety of conventional internet browsers may be used, or other web interfaces may be used, such as various interfaces provided by different personal digital assistants, as well as portable telephones, television based web access, and the like.

If desired, system 100 can be adapted to deliver alerts to a user relating to financial and/or health information. Alerts can be delivered in a variety of forms, such as by way of electronic mail, pop-up alerts, text messaging, voice mail messages, and the like.

Interactions between a user and system 100 are preferably facilitated by way of a graphical user interface ("GUI") 200, described in detail below and as depicted in FIGS. 8-19. The first set of information associated with identification with the user can include a variety of elements. For example, such information can include an identifier such as a custom username and password of the user, a user's social security number, a taxpayer identification number, a bank account and/or routing number, passport number, drivers license number and employee identification number, among others as known to those of skill in the art. If appropriate, customized logins may be provided for users based in other countries based the country of origin. Likewise, login information may be based on membership with an organization (e.g., AARP) or club or professional organization or other affiliation. Any suitable means can be used that permits unique and secure identification of the user. Generally, it will be understood that, as depicted, while GUI 200 of client layer 10 receives information from a user first, such information may subsequently be received by web interface portion 120, business logic portion 130, and portions 140 and 150 of system 100, depending on how system 100 is configured.

As further depicted in FIG. 1, a web interface 120 is provided. Web interface 120 is adapted and configured to create and format content into web pages to form the graphical user interface 200 observed by the user. Web server 120 can include a programming interface 121, such as the Internet Server Application Programming Interface (ISAPI) of Internet Information Services (IIS), commercially available from Microsoft Corporation. Programming interface 121 facilitates communication between system applications (such as integrated applications 122) and web servers 123 that make assembled web pages available to a user over the internet. Integrated applications 122 are provided that are integrated through business logic layer 130, described in detail below. Web interface 120 also manages the content and context of web pages delivered to a user using content manager 124 and context manager 125. For example, while content manager 124 manages the substance of information that is directed to a user, context manager 125 controls how the information is displayed. For example, context manager can add corporate logos and modify the appearance of graphical user interface 200. Thus, content manager 124 can specifically tailor the appearance of GUI 200 for specific users (e.g., users accessing system 100 through an open web system such as Yahoo®, or from a customized system at a private company such as IBM®) by taking generic "white label" content controlled by content manager 124 and formatting it to have a custom look and feel using context manager 125.

Web interface 120 also includes a proxy component 126 that interfaces with a proxy server 127 to permit use of external applications 139, as contrasted to integrated applications 122. A user can thus view external applications within a frame, for example in GUI 200 by such information being imported and integrated into system 100 via proxy server 127 and proxy component 126.

As further depicted in FIG. 1, system 100 further includes a business logic layer 130. As depicted, business logic layer 130 includes framework servers 131 that run programs which provide the data to populate graphical user interface 200. Framework servers 131 house and run an online framework engine 132, a business logic engine 133 and a channel syndication engine 134.

Online framework engine 132 delineates the framework that applies across all applications being run. For example, framework engine 132 designates entitlements to users. Entitlements can include, for example, permissions that a user can grant to an advisor, such as the user's accountant to grant the accountant access to selected records of the user to assist the accountant in performing services for the user. Entitlements can also be established more generally by a system administrator, to designate which applications and/or portions of applications a user has access to, and in what capacity. For example, based on a certain level of service, a user may be entitled to receive stock market quotes on a periodic or delayed basis as contrasted to a real time basis. Thus, even though system 100 may be able to access real time stock market quotes as needed by way of back end services layer 150 that contains such data, if the user is not entitled to such data at the user's designated service level, such data will not be provided to the user.

Online framework engine 132 also controls segmentation of data and applications to tailor appropriate content for GUI 200 depending on the particular user. For example, depending on the demographics of a user (e.g., gender, age, marital status, retirement, income bracket, health condition, geography, group affiliation (e.g., AARP) and the like stored in a user profile), framework engine 132 can specify content that is appropriate to the user. For example, if system 100 includes a profile for a user indicating that the user has high cholesterol, is near retirement and has children in college, the available data that could be sent to the user is segmented to filter out data such as news releases, advertisements, services and the like that may be of interest to the user such as those directed to managing high cholesterol, retirement savings and managing college expenses. As such, content segmentation can be customized by market segment, product subscription, client tiers and groups. Framework engine provides dynamic evaluation of entitlements and role membership and adjusts content, system behaviors and basic site functionality accordingly.

Figure 2:
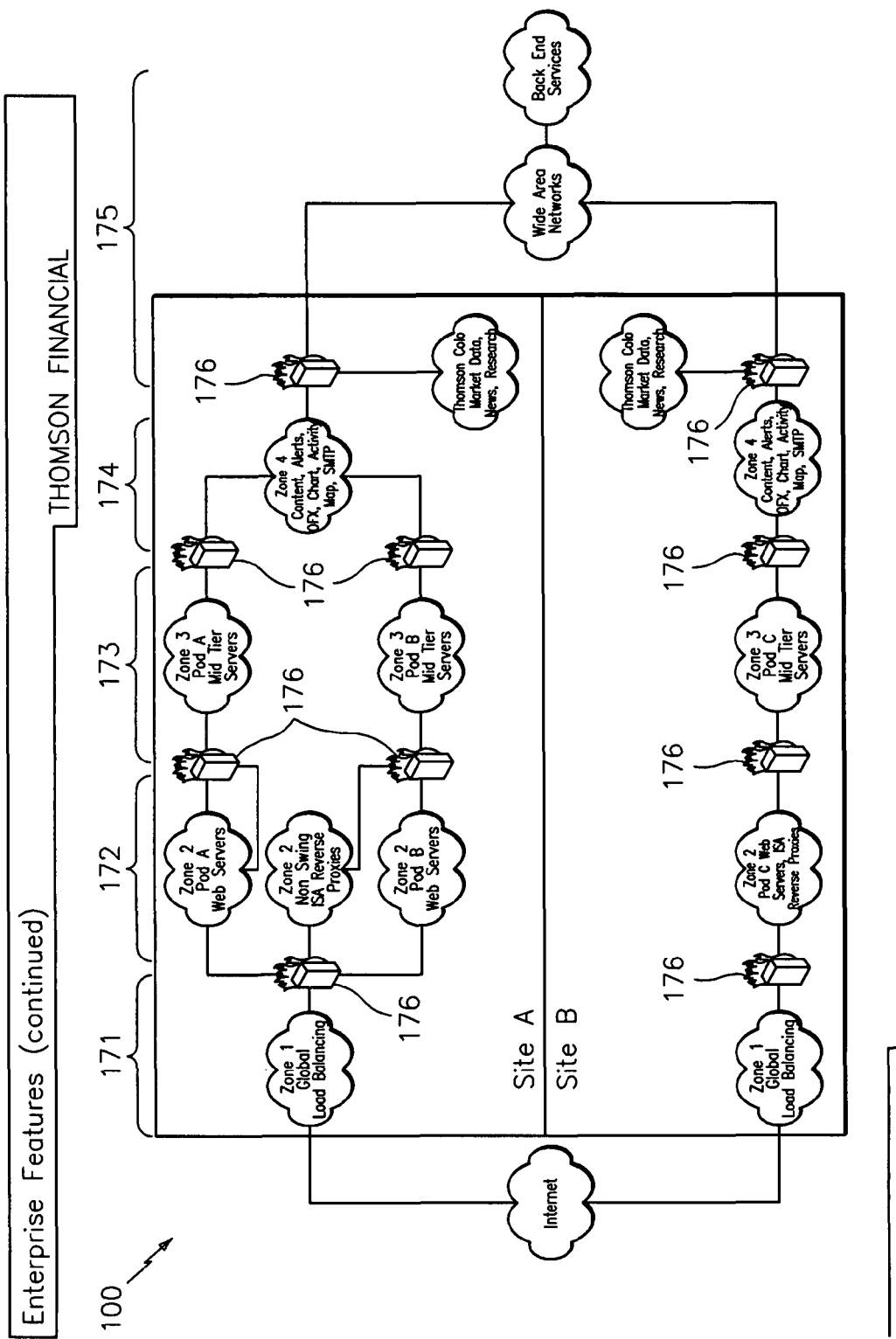
FIG. 2 is a schematic view of security aspects of the system depicted in FIG. 1.

Online framework engine 132 also controls aspects relating to system security. For example, online framework engine may include controls for determining which user data (such as account numbers) is encrypted. In accordance with one embodiment of the invention, as depicted in FIG. 2, security in system 100 is composed of multiple layers or zones including physical infrastructure. Platform, communications, application and integration protocols are utilized to facilitate communication within system 100, as are known in the art. Physical infrastructure, platforms and communications security may include multiple network zones 171-175, firewalls 176 and other intrusion detection devices, proxies for potentially vulnerable integration points and platform features (e.g., UrlMon, .NET request validation) for specific vulnerabilities.

In accordance with a further aspect of the embodiment of FIG. 1, the online application includes additional security features, including (but not limited to) mandatory input filtering that restricts data flowing to components, extensive logging, standards for data validation and manipulation to minimize common vulnerabilities, encrypted configurations, and non-persistence of operating data on Web and Application tiers of system 100.

Business logic engine 133 contains the system logic for running the integrated applications 122 described above.

Moreover, business logic engine 133 can identify information stored for example, in layer 150 in response to a user request. For example, business logic engine can retrieve information relating to financial and health accounts of a user, each account being associated with a corresponding financial or health institution. Business logic engine also includes means (e.g., software) for generating a set of information based upon the financial and health data. A resulting amalgamation of the financial and health data can be sent through the web interface 120 to be displayed to the user or advisor, for example, or can be embodied into an alert, if desired, and sent to the user.

Thus, if a user requests that a cost/benefit projection be computed, for example, business logic engine 133 controls the application to make the computation, and provides the requested result to web interface 120 which, in turn sends a signal to client layer 110 where a user sees the requested result.

If desired, a signal generated using information from the financial and health accounts can be related to a set of actionable information—that is to say, information can require action of a user. For example, business logic engine 133 of system 100 can generate actionable information in the form of a prompt requesting that the user review the amount of coverage of life insurance to see if it is adequate.

If desired, a user can perform an operation can be performed on the set of actionable information. For example, the user can press a button on the prompt including actionable information to review the amount of insurance coverage at that time, or can press a button declining the invitation. If desired, other myriad options can be provided, such as requesting a reminder to revisit the issue later. By way of a further example, the user can select an option to use a decision support tool selected by the user. Preferably, the decision support tool permits computation of a financial projection, a health projection or a lifestyle projection relevant to the actionable information. By way of example, the decision support tool may be selected from the group consisting of a calculator, a goal tracker, a college savings calculator, a drug cost saving calculator, health and disease cost calculators that can project the lifetime cost of a particular health condition, and combinations thereof. Preferably, the actionable information relates to at least one of a financial or a healthcare decision.

A decision associated with the user in response to the set of actionable information can thus be received. The financial and/or health information may be updated in layer 150 based upon the decision of the user.

If desired, an alert can be programmed by the user or advisor to remind the user of action that the user should take, or to inform the user about available products or services, for example. The alert may relate to a health decision or a financial decision, for example. The alert may be sent to the user by way of electronic mail, pop-up messages, or text messaging, among others. An alert may be contrasted from actionable information, at least to the extent that actionable information requires a user to take a step to respond, whether that be clicking on a prompt, responding within or after a certain period, and the like.

It will be appreciated that a hybrid prompt can be provided in the form of an alert that includes actionable information that must be acted upon within a predetermined time period (e.g., ten seconds). Failure to respond within the time period could remove the option to respond, but leave the alert portion of the message on the screen for display to the user.

Any suitable subject matter may be made the subject of an alert. By way of further example, quality indicators or alerts can also be provided. Specifically, personal health record information may be combined with information from drug-to-drug interaction databases (supplied, for example by Micromedex® databases owned by Thomson Healthcare) to identify drug interactions that would be applicable to individual consumers.

In a similar vein, system 100 can be equipped with fraud prevention measures to protect users of the system. For example, system 100 can be adapted to monitor accounts (e.g., financial and health) of the user (e.g., consumer/advisor) to detect unusual activity. Detected unusual activity can be reported to a consumer user and/or their advisor by way of actionable item and/or alerts as described herein. If an advisor is suspected of engaging in unscrupulous activity, or for other reasons, any activity relating to accounts to which a consumer has entrusted some degree of control to an advisor can be reported to the consumer for monitoring purposes.

The financial account viewed using system 100 may be any financial account that can be viewed on a computer. For example, the financial account may include a bank account, a tax account, a mortgage account, education account, credit account, brokerage account, a trust account and a retirement account, for example. The health account may include any health account that can be viewed using a computer, such as a benefits record, a health insurance account, a disability insurance account, a long term care insurance account, a medical record account, a health savings account, and a pharmaceutical record account, among others. Moreover, the health or financial accounts can include government provided information, such as social security accounts, Medicaid or Medicare accounts, tax withholding accounts and the like. In addition, other governmental information can be integrated and processed with the financial and/or health information such as court judgments, governmental and private liens, and the like.

It will be further understood that systems made in accordance with the invention can combine information from any number of financial, health and other accounts to create a useful end result for the user using any one of a variety of system tools. System tools can include calculators, projectors, charting applications, portfolio builders, indices, and the like, as are known in the art.

In accordance with a further aspect of system, transactions can be performed at the request of the user or the user's designee (e.g., relative or advisor). If desired, transactions performed using data relating to the health of the user may be transacted in accordance with a preselected standard. For example, the preselected standard may be one established in accordance with the Health Insurance Portability and Accountability Act ("HIPAA") or other governmentally or privately instituted standards.

Moreover, to the extent that any information contained in or processed by system 100 is subject to privacy laws, rules, contractual obligations, and/or regulations, well known procedures can be implemented to comply with all applicable national, international and foreign laws, rules, contractual obligations, and/or regulations and to safeguard the information, as are known in the art.

Channel syndication engine 134 provides the ability to "syndicate" any of the content on system 100 for display to a user in accordance with predetermined conditions. For example, syndication engine provides a means for customizing generic "white label" content for a particular end user. Thus, if the content is to be provided through a customized platform, style guides housed in syndication engine 134 accordingly facilitate "rebranding" of the "white label" content to suit a particular situation.

As mentioned above, external application 139 can also be accessed by system 100. External application 139 can take on myriad forms and is suitable for incorporation into system 100 as long as they can be displayed through GUI 200. For example, external application 139 can be used to manipulate data such as by computing financial projections. Moreover, external application 139 can be an external advertisement serving application that distributes particular advertisements to a user based on their demographics, such as their health condition and corresponding pharmaceuticals that a given consumer may be using.

As depicted in FIG. 1, data access layer 140 separates business logic layer 130 from back end services layer 150 for added security. Data access layer includes a distributed data bus 142 and a cache management engine 144. Data access layer 140 also acts as a liaison between business logic layer and back end services layer 150. Specifically, cache management engine 144 accesses content in the form of data and/or services through bus 142 from servers or other sources, for example, in back end services layer 150. The cache management engine 144 then formats and normalizes the content received so that it can be processed by business logic layer 130. Cache management engine 144 also intelligently manages the content that it obtains from layer 150. For example, if a stock quote is requested by a user, the cache management engine 144 will examine the request to see if a real time quote has been requested, or if a delayed quote would be sufficient. If a real time quote is needed, cache management engine 144 will request an updated quote from a database in layer 150. If a delayed stock quote is acceptable (e.g., a quote that can be up to 20 minutes old), cache management engine 144 can compare the stock quote stored in the cache and determine if it is recent enough to be sent to the user in response to the user request. If the quote is sufficiently recent, it can be sent in response to the request. However, if the quote stored in cache is too old, a new quote will be requested by cache management engine from layer 150.

As further depicted in FIG. 1, system 100 also includes back end services layer 150. As depicted, layer 150 includes online data stores 152, proprietary data services 154, an entitlements database 156 and client systems 158. Online data stores 152 can include one or more databases containing a variety of data content, such as data relating to profiles of users, market financial data, and other data, as desired. Proprietary data services 154, such as those provided by a company that manages system 100, can also be provided. An entitlements database 156 can also be provided to store entitlements relating to particular users and advisors, as discussed above to permit access to only selected information. Client systems 158 can include, for example, third party systems from which other proprietary data and services are obtained, such as services that aggregate accounts of a user, health and/or financial databases on which user information is stored, and the like.

Figure 3:
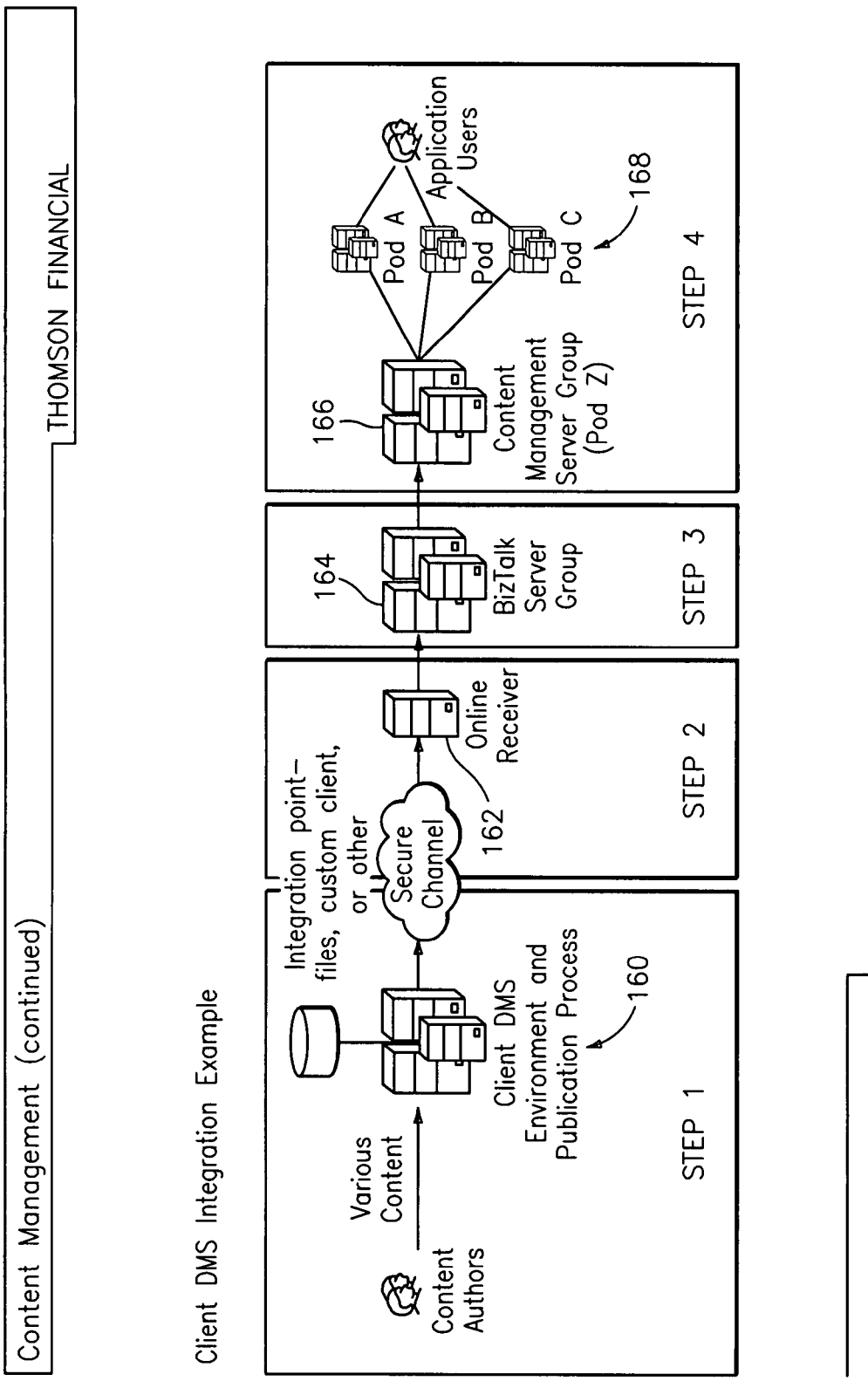
FIG. 3 is a schematic view showing how a content provider can contribute content to the system depicted in FIG. 1.

Client system content can be managed by integrating a client's Document Management System ("DMS") or other workflow system into system 100. Such integration permits a client to directly publish content to a website generated by system 100. FIG. 3 depicts the flow of such publication. As depicted, in step 1, content authors upload or otherwise create content in client DMS 160. Authors will tag content to specify who has permission to view the content. A communication link is then established between client DMS 160 and an online receiver 162 of system 100 to upload the content to system 100. Content is then directed to a server group 164 that formats and organizes the data into a form that content management servers 166 can use. Server group 164 can run software such as Microsoft® BizTalk® server software, or other appropriate software. Content is then directed to end users, such as consumers, by way of parallel redundant servers 168.

Figure 4:
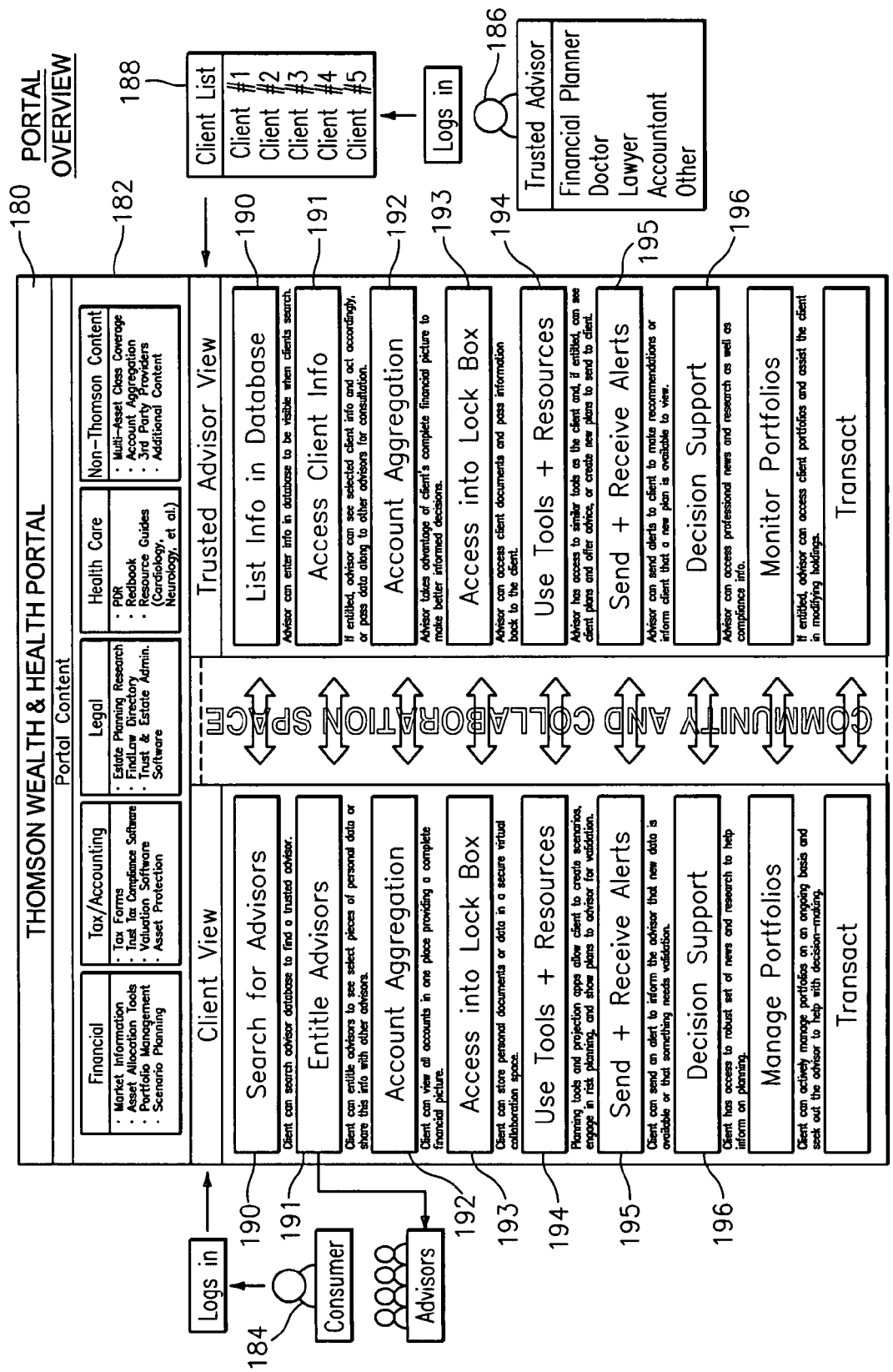
FIG. 4 is a summary view depicting exemplary functionality of the system depicted in FIG. 1.
Figure 5:
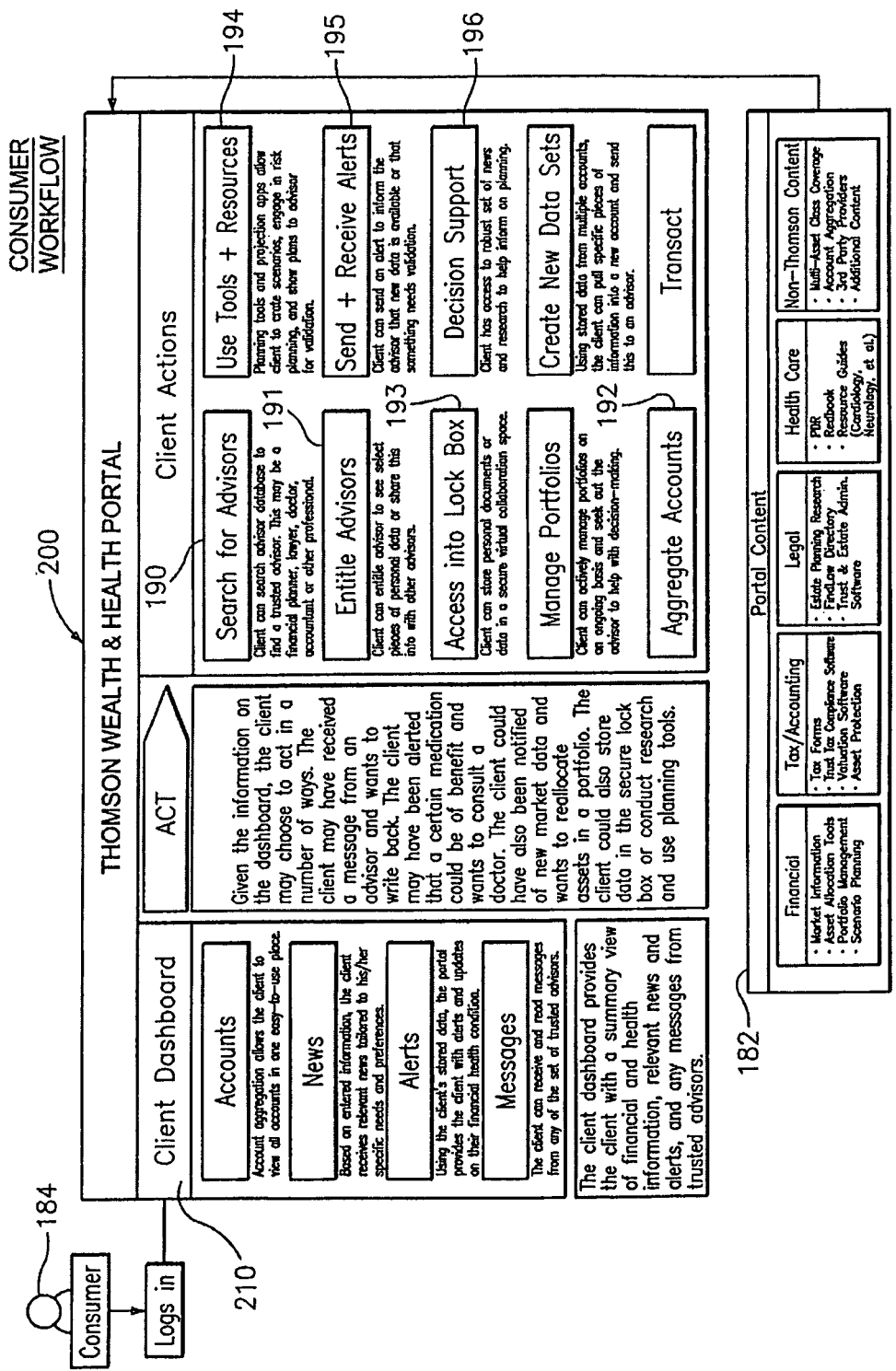
FIG. 5 is a summary view depicting selected functionality of the system depicted in FIG. 1 that may be used by a consumer.
Figure 6:
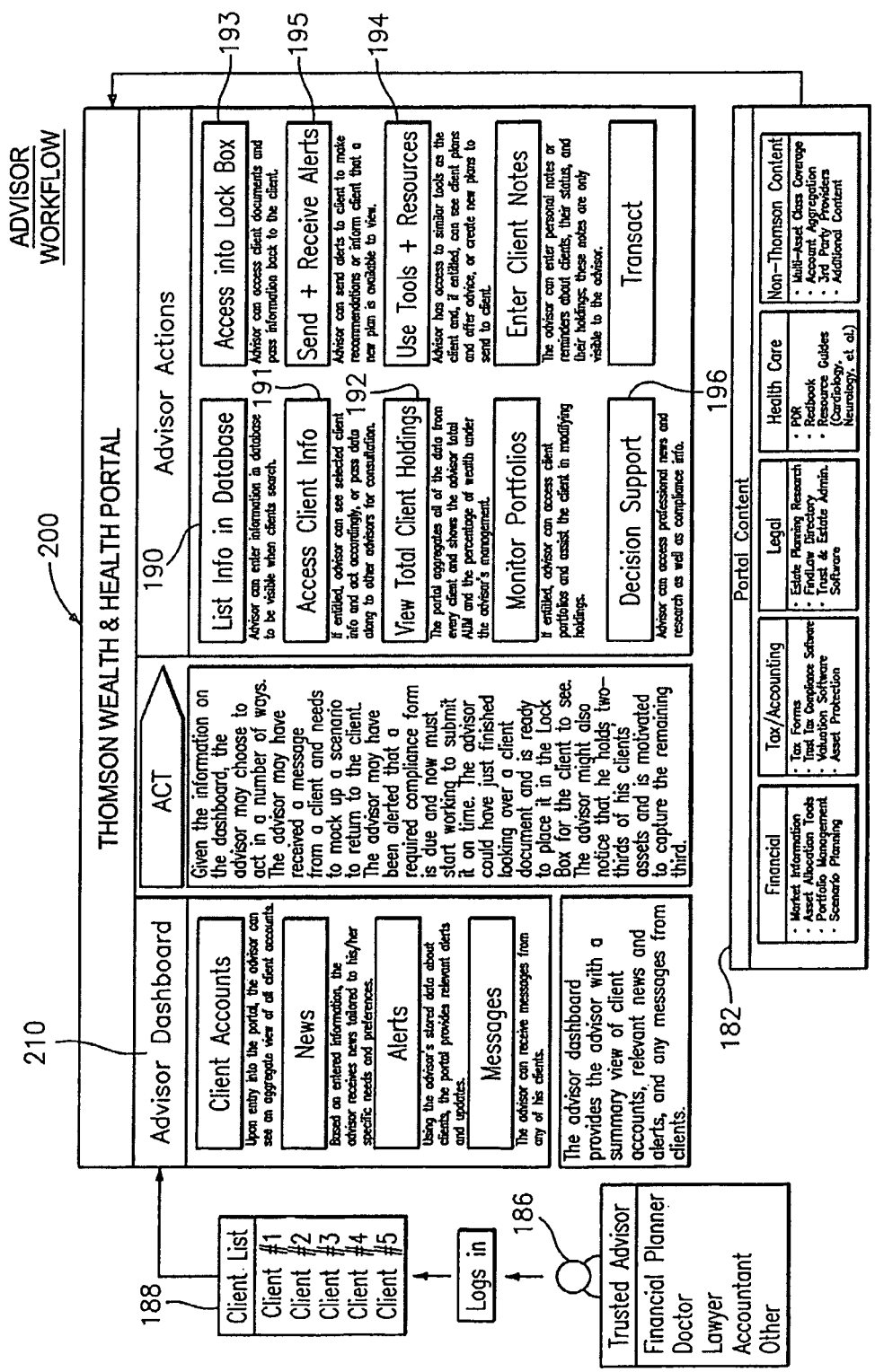
FIG. 6 is a summary view depicting selected functionality of the system depicted in FIG. 1 that may be used by an advisor.

FIGS. 4-6 depict flow charts depicting how end users such as a consumer and a consumer's advisor may interact with system 100.

FIGS. 4-5 depict how a user, such as a consumer, can interact with an advisor through the functionality of system 100. As depicted in FIG. 4, content 182 is provided to portal 180 internally through back end layer 150 and/or through external applications 139, as described herein. A consumer 184 can log into portal 180 in a variety of manners as are known in the art. Once logged in, consumer 184 can access myriad services and functions of system 100. For example, consumer 184 can perform a search of an advisor database 190 to identify a trusted advisor, or to find a new or additional advisor. The consumer can then entitle one or more advisors to view selected portions of the consumer's personal data using an entitlement application 191. The consumer can review an aggregation of their accounts, such as financial and health accounts using an aggregation function 192. If desired, a consumer can upload images or other data to a personal file or "lock box" 193 that can permit sharing of the data with one or more trusted advisors, as specified by the consumer. The consumer can also apply tools and resources 194 to analyze their finances, and the effect of their health or lifestyle thereon. For example, planning applications can be provided such as cost calculators and projectors to permit a user to plan their budget, retirement plans, education plans, and the like, for example. Moreover, health information of a user can be imported into a health insurance calculator to assist a user in obtaining or replacing health insurance. An alerts engine 195 can also be accessed by the consumer to specify if and when the consumer can receive alerts related to their health or finances, for example. A decision support portal 196 is also provided to supply the consumer with any research or other information needed to help the consumer make decisions relating, for example to health and finances. The consumer can also actively manage financial portfolios and the like using portfolios as desired on an ongoing basis, and engage in financial or health related transactions, for example, using portal 180.

As further depicted in FIGS. 4-6, item 182 depicts exemplary content that may be accessed and manipulated by a consumer 184 or their designee through portal 180. While the content can be managed by way of third party relationships between the administrator of system 100 and third party information vendors, it will be recognized that other content sources can be used. For example, if desired, system 100 can be adapted to incorporate information from the internet (such as by way of an internet search engine). Moreover, if desired, a consumer can specify that a particular vendor be used to supply information that the administrator of system 100 does not have a pre-established relationship with. For example, the user can request information from online sources such as newspapers, or private networks such as educational libraries, or other online information stores, as desired.

FIG. 5 depicts additional detail regarding possible consumer workflow. Consumer 184 is provided with a graphical user interface 200 that can initially present the consumer with a summary or "dashboard" 210, described in detail below. Briefly stated, dashboard 210 is a webpage that preferably includes a summary of pertinent information relating to the user's overall financial, health and lifestyle picture. Dashboard 210 can include an account summary window that may include an aggregation of multiple client accounts, a news window that includes particular news of interest to consumer that has preferably been segmented as described herein based on a profile of the consumer relating to their demographics. An alerts window may also be provided that includes alerts from advisors relating to health and/or financial information, for example, or from other sources, as desired. A message window may also be provided listing messages from one or more advisors, as specified in accordance with a consumer's preferences.

As further depicted in FIG. 5, based on information on dashboard 210, a consumer may wish to take action, for example, in response to changes in account balances, news, alerts or a message from an advisor. Accordingly, a variety of client actions may be carried out by consumer as depicted in FIG. 5, and as described in detail with respect to FIG. 4.

A user such as an advisor 186, on the other hand, can also log into system 100 to access records of and/or communicate with one or more clients as depicted in FIGS. 4 and 6. Advisor 186 may select a client from a client list 188 in order to access information relating to a particular client. When logged into portal 180, advisor 186 can access a suite of functions. For example, an advisor can upload credentials into advisor database 190 to make suitable potential clients aware of their services. Client information can be accessed by advisor 186 if they have been given permission by the consumer to view their pertinent information by way of entitlement application 191. If given permission by the client consumer, advisor 186 may view the complete financial picture of consumer 184 to permit advisor to give the most appropriate advice to the consumer. Advisor 186 can be granted permission by consumer 184 to review various information in lock box 193 to assist advisor 186 in advising consumer 184. Advisor has access to similar tools 194 as consumer 184, and can use such tools to review proposals made by consumer 184, and to modify or otherwise create plans for consumer 184 to review further. Alerts engine 195 can similarly be configured by advisor 186 to send alerts to one or more clients. Advisor can also have access to the latest news and research to assist advisor in advising clients via decision support portal 196. It will be recognized that varying levels of service may be provided to consumer and advisor, as appropriate. For example, a baseline level of services can be provided to a consumer or advisor for a minimal fee or no fee, with the possibility to upgrade to higher levels of service for a fee. If given permission by a consumer, advisor 186 can monitor various portfolios for consumer 184 and engage in appropriate transactions.

A variety of advisors can be given access to a user's account as the user desires. For example, financial and health advisors can be given access to system 100. For example, financial advisors, such as stockbrokers, financial planners, accountants, credit analysts, real estate agents, attorneys, guardians, an individual with a power of attorney, and the like may be granted access by a user. The health advisor may include, for example, a doctor, a health insurance agent, a physical therapist, a psychologist, a nutritionist, a therapist and a spiritual advisor, among others. Information such as credentials and relevant experience of an advisor can be provided in advisor database 190 to assist a user in selecting an advisor.

As depicted in FIG. 6, advisor 186 is provided with system functionality that is analogous to, and complements that provided to a consumer as depicted in FIG. 4. As depicted, advisor 186 is similarly provided with a dashboard 210 including a client account portal including information relating to one or more clients of the advisor. Dashboard 210 also includes a news portal listing news of relevance to the advisor. Dashboard further includes an alert portal and a message portal, including messages from the advisor's clients, for example. As depicted in FIG. 6, depending on what information is presented on the dashboard 210, the Advisor may elect to take action in a variety of ways. For example, the advisor 186 may have received a message from a client and needs to mock up a scenario to return to the client. On the other hand, the advisor 186 may have been alerted that a required compliance form is due and now must start working to submit it on time. The advisor 186 could have just finished looking over a client document and is ready to place it in the Lock Box 193 for the client to review. The advisor 186 might also notice that he holds only two-thirds of his clients' assets and is thus motivated to capture the remaining third, for example. To facilitate these actions, the advisor can access any one of the functions made available to him by system 100.

Figure 7A:
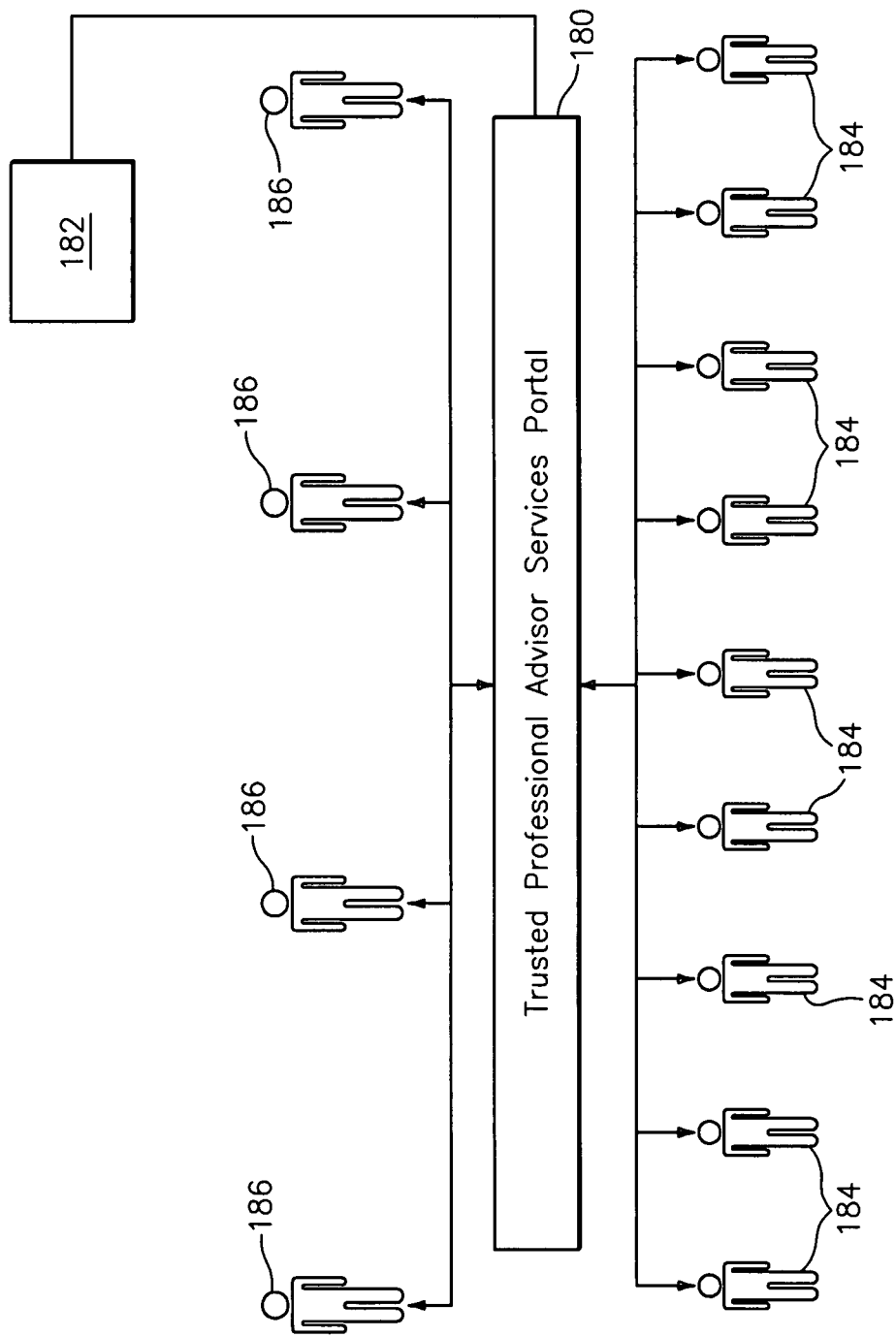
FIGS. 7(A)-7(C) are schematics illustrating further aspects of systems made in accordance with the invention.
Figure 7B:
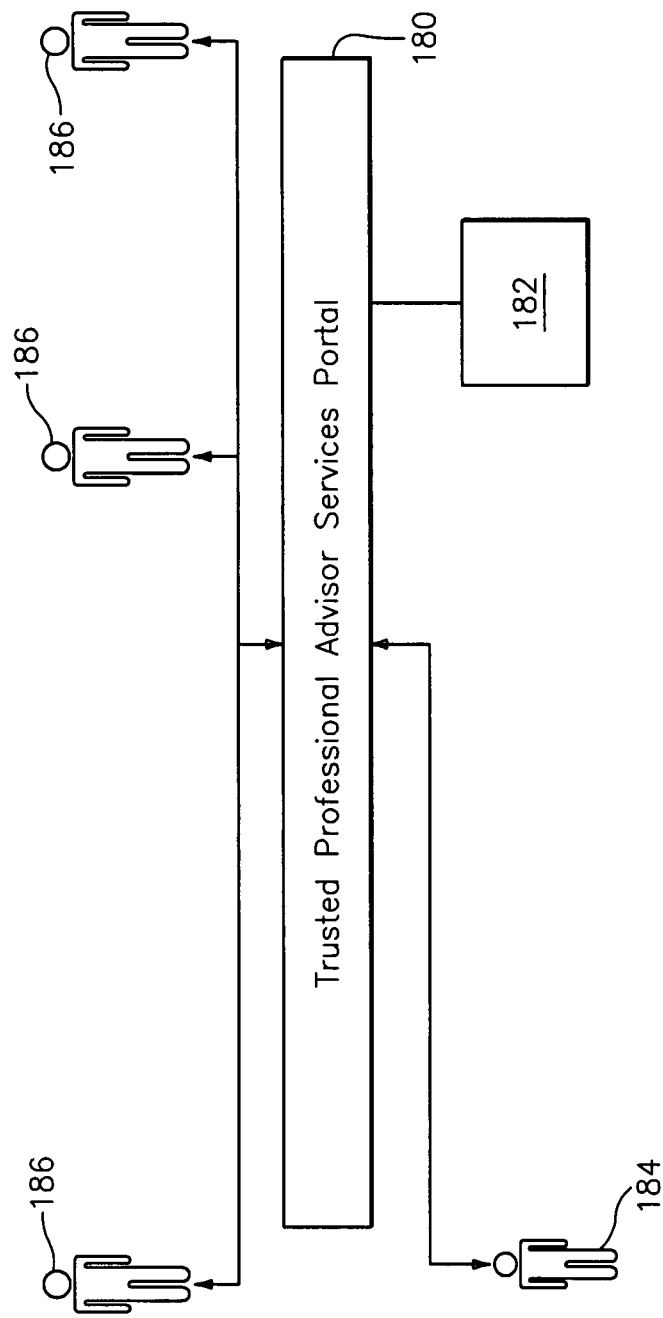
Figure 7C:
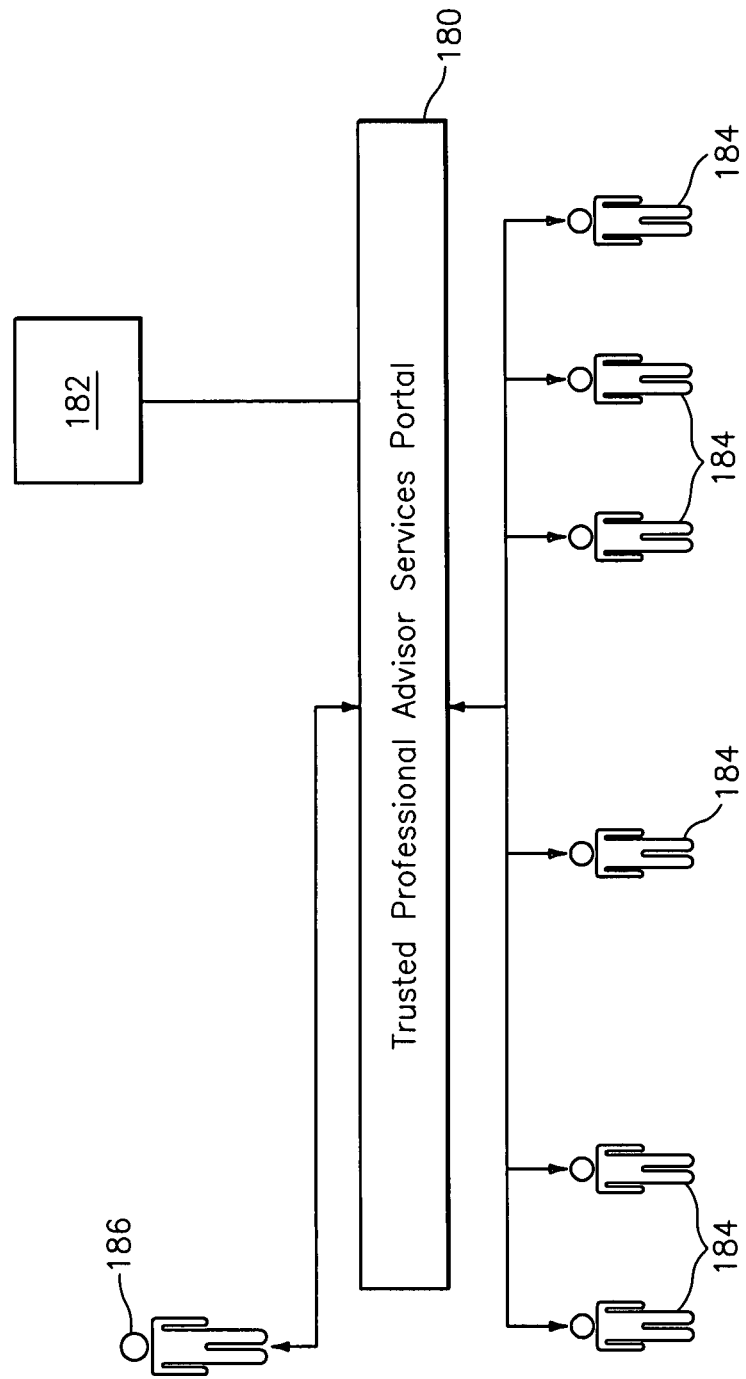

It will be appreciated that while system 100 as embodied herein supports direct relationships between individuals (e.g., consumer-advisor), it will be understood that systems made in accordance with the invention can support multiple relationships, particularly in a non-hierarchical fashion, as depicted in FIGS. 7(A)-7(C). For example, FIG. 7(A) illustrates that system 100 may result in creation of multiple parallel relationships between one or more advisors 186 and one or more consumers 184. As depicted in FIG. 7(B), from the standpoint of consumer 184, multiple advisors 186 and various content 182 may be accessed, as desired. Conversely, as depicted in FIG. 7(C), from the standpoint of a advisor 186, multiple consumers/clients 184 may be accessed, as well as various content 182 as disclosed herein.

As depicted in FIGS. 8-19, an exemplary embodiment of a consumer's graphical user interface 200 is depicted. As depicted in FIG. 8, when a user logs in, they are presented with a dashboard or summary view, 210, as mentioned above. In the embodiment of FIG. 8, a user may select among a plurality of tabs along the top of GUI 200 to view their health profile 230, their wealth profile 260, their goals 270, tools and calculators 290, advisors 300, transactions 320 and recommendations 340.

As depicted in FIG. 8, dashboard 210 includes a consumer profile window 212. Consumer profile may include pertinent information about the consumer including members of the consumer's family, if desired. Such information can include vital statistics, such as a user's current health conditions, height, weight, family health history, current prescriptions, inoculations, other aspects relating to preventive care, and the like. Relative indices 212a can be provided comparing the relative health and wealth of a user and/or their household with an average or percentile value, as desired. As further depicted in FIG. 8, dashboard 210 further includes a summary balance sheet window 214. As depicted, balance sheet window 214 depicts household and/or individual net worth, major assets and their corresponding values, as well liabilities and their related balances. It will be appreciated that balance sheet window 214 can be adapted and configured to include any asset or liability that may impact net worth, as well as income. As depicted, dashboard 210 further includes a window 216 displaying news and alerts for a consumer. Window 216 includes an alert portion 217 and a news portion 218. A user can redefine what types of alerts it receives by selecting "edit" options 217a, 218a on each respective window. Alert window 217 can include alerts specified by the user and/or an advisor of the user relating, for example to any suitable aspect of their finances, health and/or lifestyle. As depicted, the user has been informed that there has been a change in the status of a goal of the user. News window 218 can similarly include news relating to any topic of interest to a user. The user and or system 100 may specify what news and alerts the user sees in window 216. Dashboard 210 further includes a retirement account window 220 showing the types of assets contained in the user's retirement account. As depicted, dashboard 210 also includes a health cost tracker 224 and a goal tracker summary window 222. Goal tracker summary window 222 can be configured by the user to track whatever goals that the user may have that appear in goal window 270, described in detail below. As depicted in FIG. 8, the goal tracker has been configured to send an alert to the alert window if a change in status occurs with respect to achieving one of the user's goals. As depicted in FIG. 8, the user has been informed that there has been a change in the status of one of their goals, so the user selects to view the goal window 270.

Figure 9:
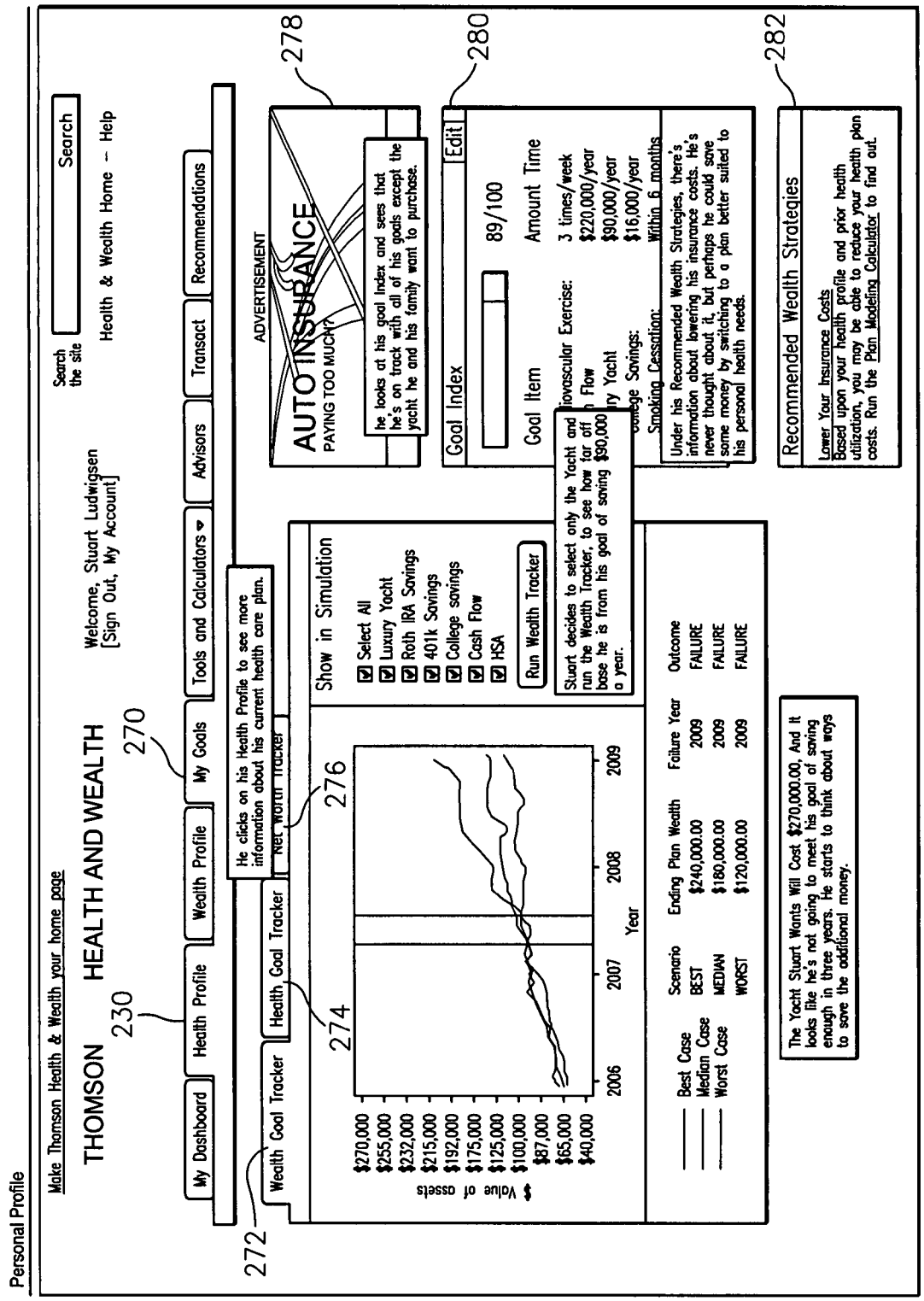
FIG. 9 depicts a portion of the graphical user interface of FIG. 8 displaying a goal tracker page.

As depicted in FIG. 9, the user's goals are depicted in a goal window 270. The user's goals can include further detail on the goals appearing in goal tracker summary window 222, as well as other goals, if desired. In the embodiment of FIG. 9, the goal window 270 includes a tabbed menu from which the user can select to view their wealth goals by selecting a wealth goal tracker 272, a health goal tracker 274 and a net worth tracker 276. A goal index window 280 is provided disclosing a goal index, to give the user an indication of his progress in achieving his goals. It will be appreciated that any financial, wellness, lifestyle or other goals (e.g., professional, educational, spiritual, scheduling goals and the like) may be established in goal window 270 and tracked accordingly. In the particular example depicted in FIG. 9, the user has been informed that one of his goals will not be met. The system 100 recognizes that the user needs to conserve expenses, and suggests a recommended wealth strategy in recommendation window 282 by advising the user to explore lowering his insurance costs. System 100 further directs an advertisement into advertisement window 278 directed to saving money on car insurance accordingly. The user then clicks on his health profile 230.

As depicted in FIG. 10, the user's health profile 230 is displayed. Health profile 230 includes a summary health profile window 232 including basic biographical information, health plan and associated cost information, a drug summary window 234 listing the medications the user is currently on including refill dates, a health and wellness index window 236 providing a health risk score based in part on whether the user has been current in seeking preventive care, a disease profile window 238 indicating health conditions the user has as well as a health history summary window 240 listing recent doctor visits. It will be appreciated that any suitable number of windows directed to any desired topics relating to be the health of a user may be displayed in health profile 230. The health profile also includes a submenu 242 from which the user can select to view more detailed information regarding their health. In the particular example of FIG. 10, the user elects to view further details on his current prescriptions by viewing "Medication Details."

Figure 13:
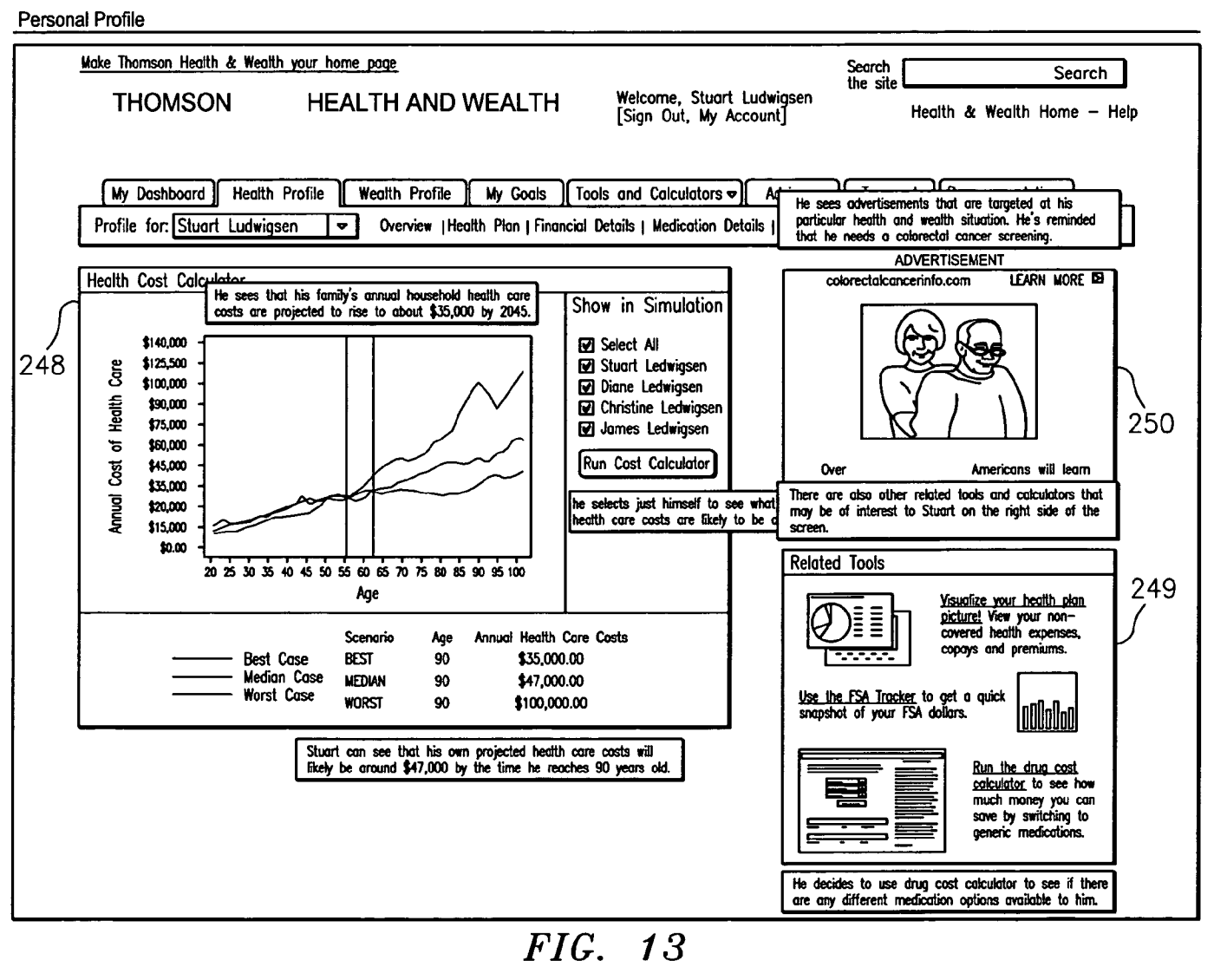

A Medication Details window 244 is presented in FIG. 11. Medication details window 244 includes a prescription summary 245 indicating the dosage, quantity, refill dates, and refill and annual costs for each medication. A total annual medication cost is presented below summary 245. A medication alerts tab 246 may be selected by the user to establish alerts relating to the users prescriptions, or to store alerts relating to pertinent topics, such as drug interactions. In the example of FIG. 11, the user deletes Nexium from his list of medications and recomputes his total annual medication cost. As depicted in FIG. 12, the user then selects a tools link 247 and selects a health cost calculator 248 to create a projection of his possible future health care costs. As depicted in FIG. 13, the health cost calculator indicates to the user that his family's annual household healthcare costs could rise to about $35,000 by 2045 and that his personal healthcare costs could be about $47,000 annually when he reaches an age of 90 years.

As depicted in FIG. 13, system 100 further prompts the user by supplying information directed to related tools in window 249. An advertisement in advertisement window 250 reminds the user that he is due for a medical screening. In accordance with the example of FIG. 13, we are further informed that the user selects a drug cost calculator 252 to determine if there are any additional medication options available to him.

Figure 14:
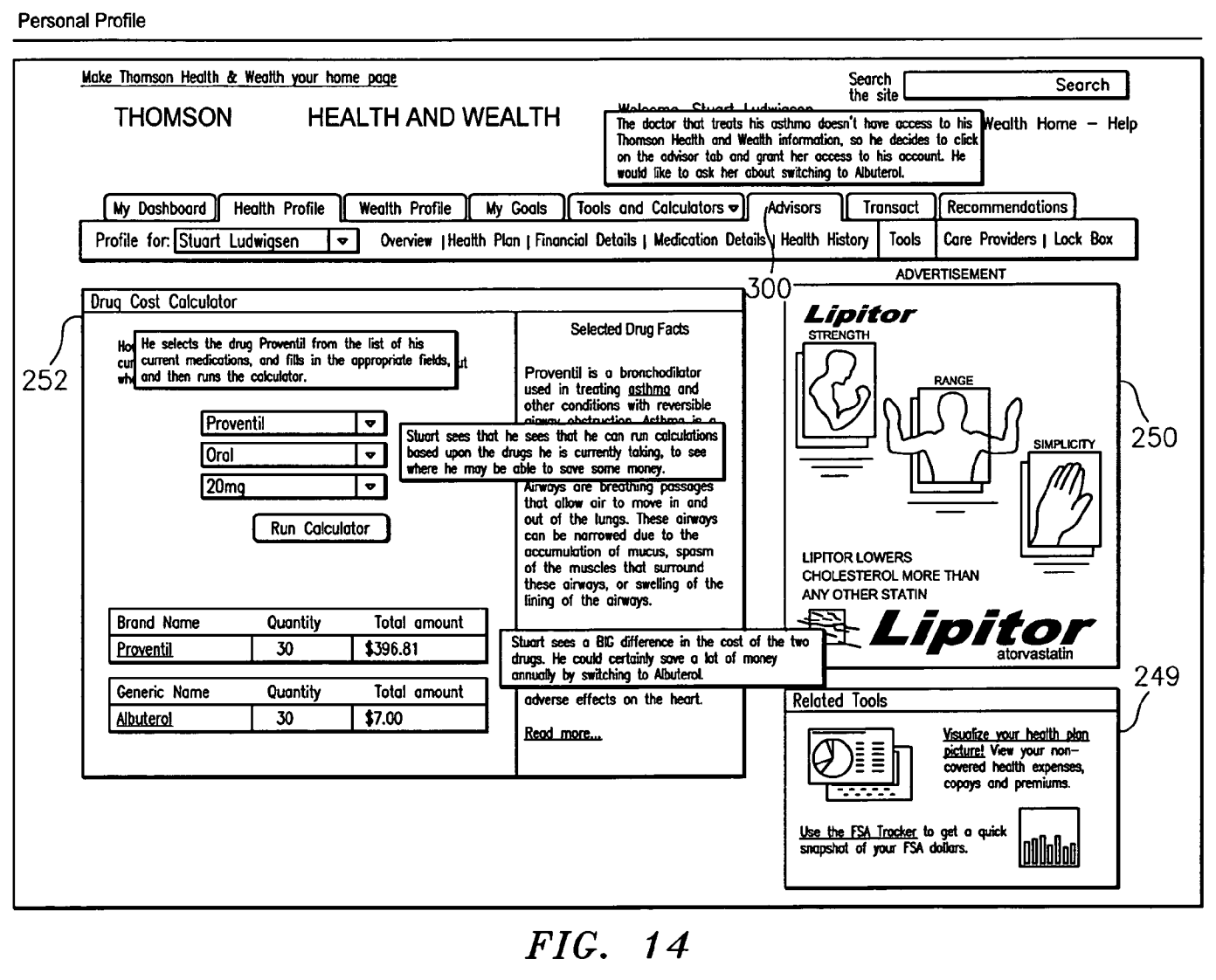

Drug cost calculator 252 is presented in FIG. 14. As depicted, the user enters the name, type and dosage of the drug he wants to research. In response, the drug cost calculator returns an alternative drug having a much lower cost.

As depicted in FIG. 14, a drug cost savings calculator is provided. It will be appreciated by those of skill in the art that the invention described herein more broadly provides useful algorithms and methods to support the identification of potential cost savings for a consumer. By way of further example, in the insurance context, it may be determined that a consumer could save money by changing their auto or health insurance. For example, system 100 could be provided with data relating to past traffic incidents by user to help them find the most suitable, lowest price auto insurance, or by providing system 100 with pertinent health data about the consumer, system could identify potential health insurance cost savings.

With further reference to FIG. 14, in response to discovering a lower cost possible alternative drug, the user decides to look up the doctor that treats his underlying condition requiring the medication to give the doctor access to his health information on system 100. The user begins by selecting the appropriate tab to view his "Advisors" window 300. System 100 can also indicate to the user whether any possible replacement drug may have any potential adverse interactions with other prescriptions or medicaments that user currently takes. Similarly, information relating to other health information such as allergies (such as to medications) as well as other allergies can be entered into and accounted for by system in making recommendations to the user.

Figure 15:
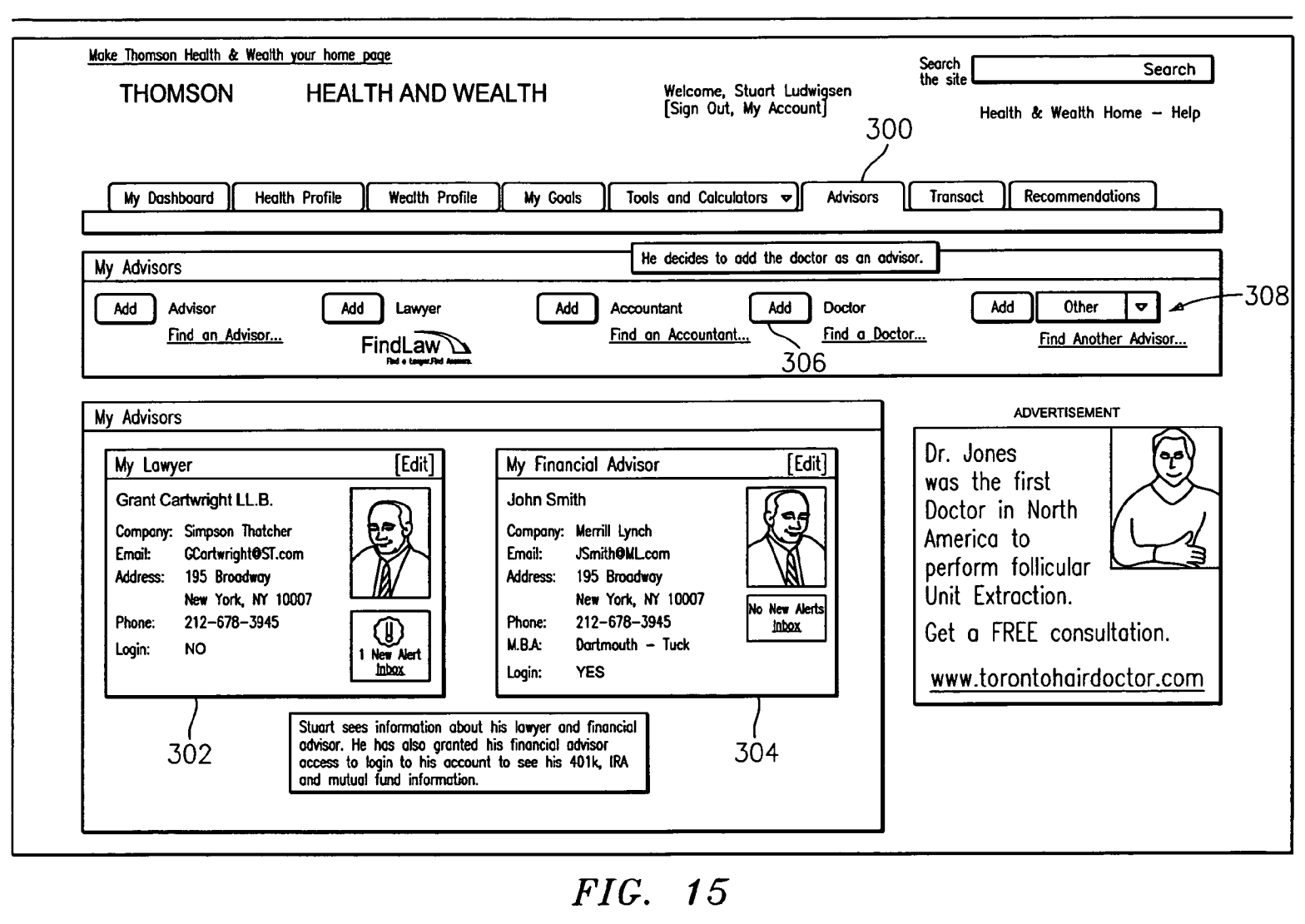

FIG. 15 depicts the Advisors window 300. As depicted, the Advisors window 300 lists the user's two designated advisors 302, 304. As depicted, the user has granted his financial advisor access to login to the user's account to view the user's 401k, IRA and mutual fund information. The user decides to add his doctor to his list of advisors, so the user selects "Add" button 306 to add his doctor. As shown in FIG. 15, similar options exist for adding another advisor, such as an attorney or accountant. A further selection field 308 is present to permit the user to select an additional category of advisor.

Figure 16:
FIG. 16 depicts a portion of the graphical user interface of FIG. 8 displaying a page for adding an advisor to the consumer's list of advisors.
Figure 17:
FIG. 17 depicts a further view of the portion of the interface depicted in FIG. 16.
Figure 18:
FIG. 18 depicts an updated view of the summary depicted in FIG. 15.
Figure 19:
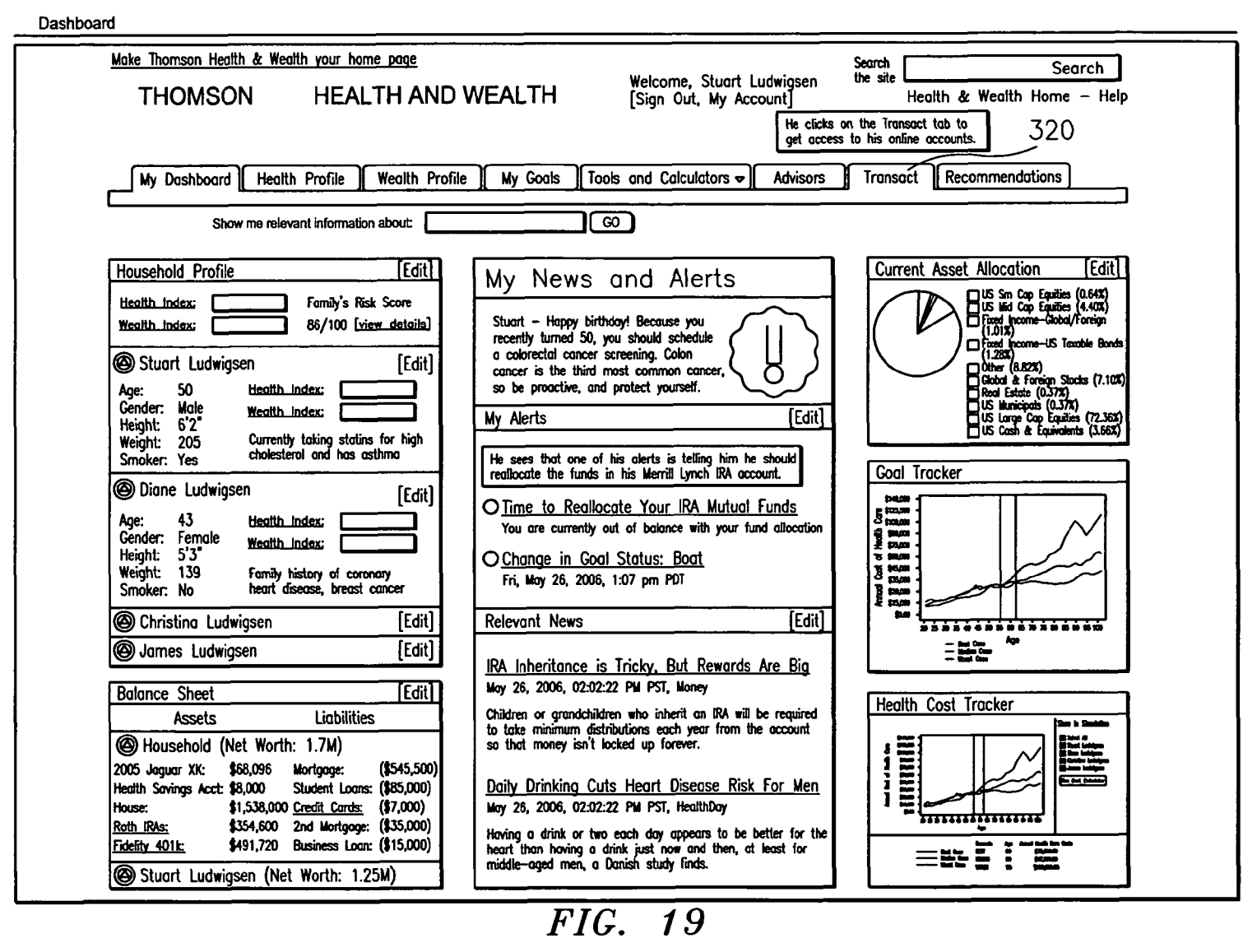

As depicted in FIG. 16, after selecting option 306, the user is presented with a screen 310 including fields 312 to add a doctor to the user's list of advisors. The user enters the doctor's name and then, by selecting a search option 314, searches to determine if the doctor already has an account on system 100. In response, as shown in FIG. 17, a result field 316 presents possible matches to the search request. The user notes that the user's doctor already has an account, and chooses to add the doctor to the user's list of advisors, as depicted in FIG. 18. After completing this task, the user selects the dashboard tab to display the dashboard 210, and, as shown in FIG. 19, selects the transact tab 320 to view his online accounts.

In further accordance with the invention, a machine readable program on a computer readable medium containing instructions for controlling a system for managing multiple accounts associated with a user is provided. For purposes of illustration and not limitation, the machine readable program is adapted to be read by processors, for example in framework servers 131 as depicted in FIG. 1, and preferably comprises a portion of business logic 133. The computer program may be embodied either in software or in hardware, such as a memory chip the system 100 for framework servers 131 to access when needed. Computer program is preferably embodied in software and run from framework servers 131.

The computer program may be written using techniques well known in the art. The computer program in accordance with the invention has instructions therein for operating a system, such as system 100 described herein. The program can include, for example, a first computer code segment for processing a first set of received information associated with identification of the user. The first set of information can include a variety of means for uniquely identifying the user, as described herein. The program also includes a second computer code segment for identifying a second set of information in response to the first set of information, the second set of information relating to a financial account associated with the user, such as the types of financial accounts disclosed herein. The program further includes a third computer code segment for identifying a third set of information in response to the first set of information, the third set of information relating to a health account associated with the user. As with the system of the invention described herein, any one of a variety of health accounts may be accessed by the program of the invention. The program also includes a fourth computer code segment for generating a fourth set of information based upon the second set of information and the third set of information. The fourth set of information can comprise, for example, an amalgamation of financial and health information or a subset thereof, as described herein. Program also includes a fifth computer code segment for sending a signal representative of the fourth set of information to the user or a designee of the user. The signal can be sent in the form of an actionable message, an alert or the like.

The computer program provided in accordance with the invention can accomplish a variety of functions. By way of example, the computer program can facilitate all functions of system 100 described herein (and similar systems) and may be used to control the form and function of graphical user interface 200 as embodied herein.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The block diagrams herein, such as those depicted in FIGS. 1-6, represent conceptual views of illustrative circuitry and software embodying the principles of the invention. Thus the functions of the various elements shown in the Figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. The functions of those various elements may be implemented by, for example, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

Similarly, it will be appreciated that the system flows in the flow charts depicted in FIGS. 4-6, for example, shown herein, represent various processes which may be substantially represented in computer-readable medium and so executed by a computer or processor, whether or not such computer or processor is explicitly shown. Moreover, in the flowcharts shown herein, the various blocks can be understood as representing not only processing and/or other functions but, alternatively, as blocks of program code that carry out such processing or functions.

Systems made in accordance with the invention herein can be constructed, for example, using techniques similar to those described in copending U.S. patent application titled "Pay-For-Access Legal Research System With Access To Open Web Content" bearing Ser. No. 11/422,281, filed Jun. 5, 2006, which is incorporated by reference herein in its entirety.

The methods and systems of the present invention, as described above and shown in the drawings, provide for a method, system, machine readable program and graphical user interface with superior functionality that can facilitate the management of wealth. It will be apparent to those skilled in the art that various modifications and variations can be made in the embodiments of the present invention without departing from the spirit or scope of the invention. Thus, it is intended that the present invention include modifications and variations that are within the scope of the appended claims and their equivalents.

What is claimed is:

1. A method for managing multiple accounts associated with a user, the method comprising:
    (a) receiving a machine readable data signal into a computer system, the signal including a first set of information associated with identification of the user;
    (b) in response to the first set of information, identifying a second set of information using the computer system, the second set of information relating to a financial investment account associated with the user, the financial investment account being associated with a financial institution;
    (c) in response to the first set of information, identifying a third set of information using the computer system, the third set of information relating to a health account associated with the user, the health account being associated with a healthcare institution and unassociated with the financial investment account;
    (d) generating a fourth set of information with the computer system based upon the second set of information and the third set of information, wherein the fourth set of information includes at least one item of information not provided in any of the first, second, and third sets of information; and (e) sending from a server a machine readable signal including the fourth set of information to the user or a designee of the user.

2. The method of claim 1, wherein the first set of information includes information selected from the group consisting of an account number, a telephone number, a website username, a date, an electronic mail address and combinations thereof.

3. The method of claim 1, wherein the financial investment account is an account associated with the user's finances.

4. The method of claim 3, wherein the financial investment account is selected from the group consisting of a bank account, a mortgage account, a tax account, an education account, a credit account, a brokerage account and a retirement account.

5. The method of claim 1, wherein the health account is selected from the group consisting of a benefits record, a health insurance account, a disability insurance account, a long term care insurance account, a medical record account and a pharmaceutical record account.

6. The method of claim 5, further comprising performing transactions using data relating to the health of the user, wherein the transactions are transacted in accordance with a preselected standard.

7. The method of claim 6, wherein the preselected standard is established in accordance with HIPAA.

8. The method of claim 1, wherein the fourth set of information is an amalgamation of the second set of information and the third set of information.

9. The method of claim 1, wherein a fifth set of information is identified in response to the first set of information, the fifth set of information relating to a second financial investment account of the user.

10. The method of claim 9, wherein the second financial investment account is associated with a second financial institution.

11. The method of claim 10, wherein the fourth set of information is generated using the fifth set of information.

12. The method of claim 1, wherein a sixth set of information is identified in response to the first set of information, the sixth set of information relating to a second health account of the user.

13. The method of claim 12, wherein the second health account is associated with a second health institution.

14. The method of claim 12, wherein the fourth set of information is generated using the sixth set of information.

15. The method of claim 1, wherein the second set of information further includes information relating to a financial advisor of the user.

16. The method of claim 15, wherein the financial advisor is selected from the group consisting of a stockbroker, a financial planner, an accountant, a credit analyst, a real estate agent, and an attorney.

17. The method of claim 15, wherein the second set of information includes information relating to the credentials of the financial advisor.

18. The method of claim 1, wherein the third set of information further includes information relating to a health advisor of the user.

19. The method of claim 18, wherein the health advisor is selected from the group consisting of a doctor, a health insurance agent, a physical therapist, a psychologist, a spiritual advisor and a therapist.

20. The method of claim 18, wherein the second set of information includes information relating to the credentials of the health advisor.

21. The method of claim 1 wherein the signal is related to a set of actionable information.

22. The method of claim 21, wherein an operation can be performed on the set of actionable information.

23. The method of claim 22, wherein the operation is performed by using a decision support tool selected by the user.

24. The method of claim 23, wherein the decision support tool permits computation of a financial projection, a health projection or a lifestyle projection.

25. The method of claim 24, wherein the decision support tool is selected from the group consisting of a retirement calculator, a college savings calculator, a drug cost saving calculator, a goal tracker, and combinations thereof.

26. The method of claim 21, wherein the actionable information relates to at least one of a financial or a healthcare decision.

27. The method of claim 21, further comprising receiving a decision associated with the user in response to the set of actionable information.

28. The method of claim 27, further comprising updating the second set of information based upon the decision.

29. The method of claim 27, further comprising updating the third set of information based upon the decision.

30. The method of claim 27, wherein the decision is selected from the group consisting of an affirmative response and a negative response.

31. The method of claim 27, wherein the decision is selected from the group consisting of an affirmative response, a negative response, or a request for a reminder to revisit the actionable information at a later time.

32. The method of claim 21, wherein the set of actionable information includes a financial projection that computes the effect of costs of the health or lifestyle of the user on the user's finances.

33. The method of claim 1 wherein the signal is related to an alert sent to the user.

34. The method of claim 33, wherein the alert relates to a health decision or a financial decision.

35. The method of claim 33, wherein the alert is sent to the user by way of electronic mail.

36. The method of claim 1, wherein the user permits an advisor to access desired profile information relating to the user in a database.

37. The method of claim 36, wherein the advisor is a financial advisor and the profile information includes financial information relating to the user.

38. The method of claim 36, wherein the user specifies a subset of the profile information that the advisor can access.

39. The method of claim 36, wherein the advisor is a health advisor and the profile information includes health information relating to the user.

40. The method of claim 1, wherein the user is a consumer.

41. The method of claim 1, wherein the user is a designee of a consumer.

42. The method of claim 41, wherein the designee is selected from the group consisting of an advisor of the user, a guardian of the user, a family member of the user, and a legal designee of the user.

43. A method as recited in claim 1, wherein the step of generating a fourth set of information includes generating the fourth set of information wherein the fourth set of information includes an analysis of the second and third sets of information to show interaction between health and finances for the user to use with financial and/or health related decisions.

44. A system for managing multiple accounts associated with a user, the system comprising:
   (a) executable machine readable program means physically embodied on a physical medium for receiving a first set of information associated with identification of the user;
   (b) executable machine readable program means physically embodied on a physical medium for identifying a second set of information in response to the first set of information, the second set of information relating to a financial investment account associated with the user, the financial investment account being associated with a financial institution;
   (c) executable machine readable program means physically embodied on a physical medium for identifying a third set of information in response to the first set of information, the third set of information relating to a health account associated with the user, the health account being associated with a healthcare institution and unassociated with the financial investment account;
   (d) executable machine readable program means physically embodied on a physical medium for generating a fourth set of information based upon the second set of information and the third set of information, wherein the fourth set of information includes at least one item of information not provided in any of the first, second, and third sets of information; and
   (e) executable machine readable program means physically embodied on a physical medium for sending a signal representative of the fourth set of information to the user or a designee of the user.

45. A machine readable program physically embodied on a computer readable medium containing instructions for controlling a system for managing multiple accounts associated with a user, the program comprising:
   (a) a first computer code segment physically embodied and executable on the physical medium for processing a first set of received information associated with identification of the user;
   (b) a second computer code segment physically embodied and executable on the physical medium for identifying a second set of information in response to the first set of information, the second set of information relating to a financial investment account associated with the user, the financial investment account being associated with a financial institution;
   (c) a third computer code segment physically embodied and executable on the physical medium for identifying a third set of information in response to the first set of information, the third set of information relating to a health account associated with the user, the health account being associated with a healthcare institution and unassociated with the financial investment account;
   (d) a fourth computer code segment physically embodied and executable on the physical medium for generating a fourth set of information based upon the second set of information and the third set of information, wherein the fourth set of information includes at least one item of information not provided in any of the first, second, and third sets of information; and
   (e) a fifth computer code segment physically embodied and executable on the physical medium for sending a signal representative of the fourth set of information to the user or a designee of the user.

46. A server for generating a graphical user interface for controlling a system for managing multiple accounts associated with a user, comprising:
   (a) means for generating a machine readable data signal segment configured to instruct a computer to generate a first field for receiving a first set of information associated with identification of the user;
   (b) means for generating a machine readable data signal segment configured to instruct a computer to generate a second field for specifying a second set of information relating to a financial account associated with the user, the financial account being associated with a financial institution;
   (c) means for generating a machine readable data signal segment configured to instruct a computer to generate a third field for specifying a third set of information relating to a health account associated with the user, the health account being associated with a healthcare institution and unassociated with the financial account;
   (d) means for generating a machine readable data signal segment configured to instruct a computer to generate a fourth field for requesting generation of a fourth set of information based upon the second set of information and the third set of information; and
   (e) means for generating a machine readable data signal segment configured to instruct a computer to generate a fifth field for displaying a signal representative of the fourth set of information to the user or a designee of the user, wherein the fourth set of information includes at least one item of information not provided in any of the first, second, and third sets of information.

47. A method for managing multiple accounts associated with a user, the method comprising:
   (a) receiving a machine readable data signal into a computer system, the signal including a first set of information associated with identification of the user;
   (b) in response to the first set of information, identifying a second set of information using the computer system, the second set of information relating to a financial account associated with the user, the financial account being associated with a financial institution;
   (c) in response to the first set of information, identifying a third set of information using the computer system, the third set of information relating to a health account associated with the user, the health account being associated with a healthcare institution and unassociated with the financial account;
   (d) generating a fourth set of information with the computer system based upon the second set of information and the third set of information, and wherein the fourth set of information includes at least one piece of information selected from the group consisting of an alert, a prompt, an explanation of drug-to-drug interactions, a projection, an advertisement, and a news release; and
   (e) sending from a server a machine readable signal including the fourth set of information to the user or a designee of the user.

48. A method as recited in claim 47, wherein the second set of information relates to a financial investment account associated with the user.

49. A system for managing multiple accounts associated with a user, the system comprising:
   (a) executable machine readable program means for receiving a first set of information associated with identification of the user;
   (b) executable machine readable program means for identifying a second set of information in response to the first set of information, the second set of information relating to a financial account associated with the user, the financial account being associated with a financial institution;

(c) executable machine readable program means for identifying a third set of information in response to the first set of information, the third set of information relating to a health account associated with the user, the health account being associated with a healthcare institution and unassociated with the financial account;

(d) executable machine readable program means for generating a fourth set of information based upon the second set of information and the third set of information, and wherein the fourth set of information includes at least one piece of information selected from the group consisting of an alert, a prompt, an explanation of drug-to-drug interactions, a projection, an advertisement, and a news release; and (e) executable machine readable program means for sending a signal representative of the fourth set of information to the user or a designee of the user.

50. A system as recited in claim 49, wherein the second set of information relates to a financial investment account associated with the user.

51. A machine readable program embodied on a computer readable medium containing instructions for controlling a system for managing multiple accounts associated with a user, the program comprising:

(a) a first computer code segment physically embodied and executable on the physical medium for processing a first set of received information associated with identification of the user;

(b) a second computer code segment physically embodied and executable on the physical medium for identifying a second set of information in response to the first set of information, the second set of information relating to a financial account associated with the user, the financial account being associated with a financial institution;

(c) a third computer code segment physically embodied and executable on the physical medium for identifying a third set of information in response to the first set of information, the third set of information relating to a health account associated with the user, the health account being associated with a healthcare institution and unassociated with the financial account;

(d) a fourth computer code segment physically embodied and executable on the physical medium for generating a fourth set of information based upon the second set of information and the third set of information, and wherein the fourth set of information includes at least one piece of information selected from the group consisting of an alert, a prompt, an explanation of drug-to-drug interactions, a projection, an advertisement, and a news release; and (e) a fifth computer code segment physically embodied and executable on the physical medium for sending a signal representative of the fourth set of information to the user or a designee of the user.

52. A machine readable program embodied on a computer readable medium as recited in claim 51, wherein the second set of information relates to a financial investment account associated with the user.

53. A method for managing multiple accounts associated with a user, the method comprising:

(a) receiving a machine readable data signal into a computer system, the signal including a first set of information associated with identification of the user;

(b) in response to the first set of information, identifying a second set of information using the computer system, the second set of information relating to at least one non-checking financial investment account associated with the user, the financial investment account being associated with a financial institution;

(c) in response to the first set of information, identifying a third set of information using the computer system, the third set of information relating to a health account associated with the user, the health account being associated with a healthcare institution and unassociated with the financial investment account;

(d) generating a fourth set of information with the computer system based upon the second set of information and the third set of information; and (e) sending from a server a machine readable signal including the fourth set of information to the user or a designee of the user.

* * * * *